(12) United States Patent
Ono et al.

(10) Patent No.: US 7,630,046 B2
(45) Date of Patent: Dec. 8, 2009

(54) LIQUID CRYSTAL DISPLAY DEVICE

(75) Inventors: Kikuo Ono, Mobara (JP); Ryutaro Oke, Mobara (JP); Takahiro Ochiai, Mobara (JP); Hirotaka Imayama, Mobara (JP)

(73) Assignee: Hitachi, Ltd., Tokyo (JP)

( * ) Notice: Subject to any disclaimer, the term of this patent is extended or adjusted under 35 U.S.C. 154(b) by 6 days.

(21) Appl. No.: 12/213,375

(22) Filed: Jun. 18, 2008

(65) Prior Publication Data

US 2008/0259265 A1    Oct. 23, 2008

Related U.S. Application Data

(60) Continuation of application No. 11/730,721, filed on Apr. 3, 2007, now Pat. No. 7,403,255, which is a division of application No. 11/374,151, filed on Mar. 14, 2006, now abandoned, which is a continuation of application No. 10/817,903, filed on Apr. 6, 2004, now abandoned, which is a continuation of application No. 10/222,836, filed on Aug. 19, 2002, now Pat. No. 6,747,722.

(30) Foreign Application Priority Data

Nov. 7, 2001    (JP) ............... 2001-341369

(51) Int. Cl.
*G02F 1/1343* (2006.01)
*G02F 1/1345* (2006.01)

(52) U.S. Cl. .............. 349/141; 349/139; 349/149

(58) Field of Classification Search .......... 349/139, 349/149, 141
See application file for complete search history.

(56) References Cited

U.S. PATENT DOCUMENTS

| | | | |
|---|---|---|---|
| 5,815,224 A | 9/1998 | Hasegawa et al. | |
| 5,914,761 A | 6/1999 | Ohe et al. | |
| 6,028,653 A | 2/2000 | Nishida | |
| 6,091,473 A | 7/2000 | Hebiguchi | |
| 6,111,625 A | 8/2000 | Ohta et al. | |
| 6,177,974 B1 | 1/2001 | Hirakata et al. | |
| 6,300,994 B1 | 10/2001 | Ohe et al. | |
| 6,356,331 B1 | 3/2002 | Ono et al. | |
| 6,522,380 B2 | 2/2003 | Lee et al. | |
| 6,545,736 B2 | 4/2003 | Ashizawa et al. | |
| 6,611,309 B2 * | 8/2003 | Park et al. | 349/141 |
| 6,636,000 B2 | 10/2003 | Asami et al. | |
| 6,806,862 B1 | 10/2004 | Zhang et al. | |

(Continued)

FOREIGN PATENT DOCUMENTS

JP    07-036058    7/1993

(Continued)

*Primary Examiner*—Julie Ngo
(74) *Attorney, Agent, or Firm*—Stites & Harbison PLLC; Juan Carlos A. Marquez, Esq.

(57) ABSTRACT

Below a transparent pixel electrode, an opaque pixel electrode is arranged while sandwiching an insulation film between the transparent pixel electrode and the opaque pixel electrode. A common electrode is arranged below the opaque pixel electrode thus forming a holding capacitance between the common electrode and an opaque metal electrode. In case when the pixel is divided into four or more portions, an interval between the pixel electrode and the common electrode is set to an unequal pitch size or an unequal electrode width within one pixel.

10 Claims, 26 Drawing Sheets

U.S. PATENT DOCUMENTS

| | | |
|---|---|---|
| 2001/0010573 A1 | 8/2001 | Ohta et al. |
| 2001/0015783 A1 | 8/2001 | Ohta et al. |
| 2001/0026344 A1 | 10/2001 | Sakamoto |
| 2002/0063835 A1 * | 5/2002 | Kim .......................... 349/141 |
| 2002/0149729 A1 * | 10/2002 | Nishimura et al. .......... 349/141 |

FOREIGN PATENT DOCUMENTS

JP  10-307301  12/1997

* cited by examiner

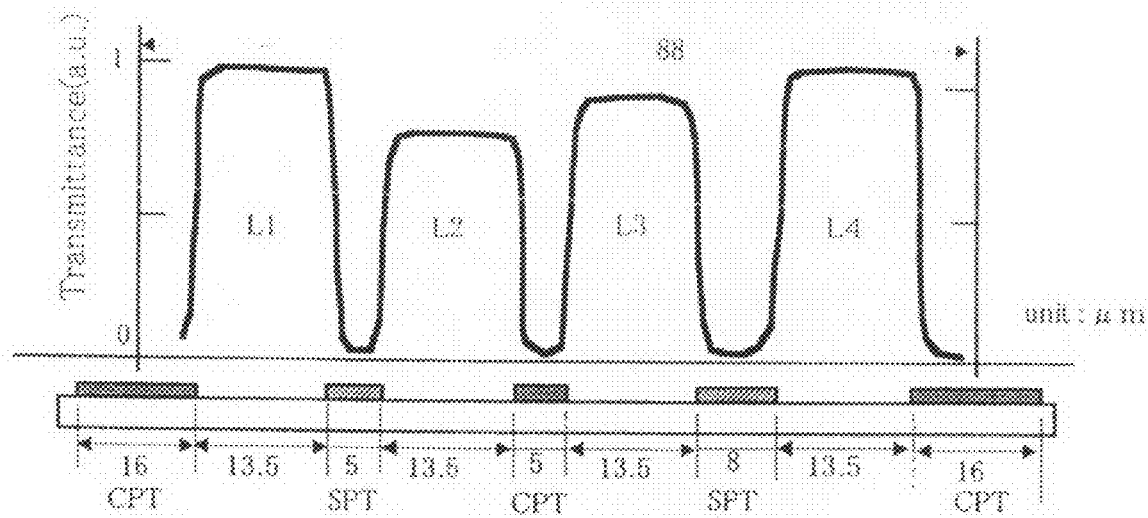
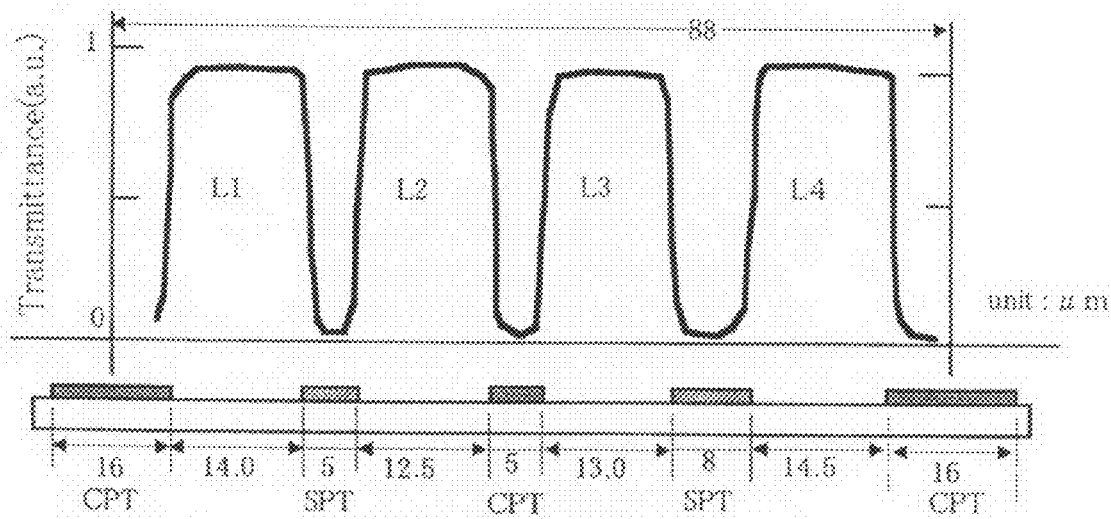

LIQUID CRYSTAL DISPLAY DEVICE

CROSS REFERENCE TO RELATED APPLICATIONS

This application is a Continuation application of U.S. application Ser. No. 11/730,721 filed Apr. 3, 2007 now U.S. Pat. No. 7,403,255, which is a Divisional application of U.S. application Ser. No. 11/374,151 filed Mar. 14, 2006 now abandoned, which is a Continuation application of U.S. application Ser. No. 10/817,903 filed Apr. 6, 2004 now abandoned, which is a Continuation application of U.S. application Ser. No. 10/222,836 filed Aug. 19, 2002 now U.S. Pat. No. 6,747,722. Priority is claimed based on U.S. application Ser. No. 11/730,721 filed Apr. 3, 2007, which claims the priority of U.S. application Ser. No. 11/374,151 filed Mar. 14, 2006, which claims the priority of U.S. application Ser. No. 10/817,903 filed Apr. 6, 2004, which claims the priority of U.S. application Ser. No. 10/222,836 filed Aug. 19, 2002, which claims the priority date of Japanese Patent Application No. 2001-341369 filed Nov. 7, 2001, all of which is incorporated by reference.

BACKGROUND OF THE INVENTION

1. Field of the Invention

The present invention relates to a liquid crystal display device, and more particularly to an active matrix liquid crystal display device of a thin film transistor (hereinafter referred to as "TFT") type or the like and a manufacturing method thereof.

2. Description of the Related Art

A liquid crystal display device, in view of its characteristics that the device is thin, light-weighted and exhibits low power consumption, has been popularly used as a display equipment for image information and character information of an information equipment as represented by a personal computer, a portable information terminal, a portable telephone, a digital camera, and a visual equipment such as a camera-built-in type VTR equipment. Recently, along with spreading of large-capacity media or starting of BS digital broadcasting due to the advent of DVD and the rapid progress of large-capacity magnetic drives, the fusion of a personal computer and a video digital media is in progress and the demand for an image display device having high image quality which can cope with such an application is increased. A liquid crystal display adopting an in-plane switching (IPS) mode which applies a lateral electric field to liquid crystal sealed in a gap defined between upper and lower substrates has been recognized as a display method which is capable of satisfying such a demand for high image quality and various improvements have been made aiming at the further enhancement of the image quality.

On the other hand, along with spreading of portable telephones and portable information terminals, the demand for medium-sized or small-sized liquid crystal display devices which exhibit extremely small power consumption has been increased.

In the liquid crystal display device adopting the IPS mode, as disclosed in Japanese Patent Laid Open H07-36058, a method which performs switching of liquid crystal using a lateral electric field which is generated between two-layered metal electrodes sandwiching an insulation film therebetween has been most popularly used. A defect of such a structure lies in that, compared to a display device adopting a usual TN method, it is difficult to increase the numerical aperture of pixels so that the light utilization efficiency is low. Since it is necessary to increase the brightness of a backlight to compensate for this defect, as the whole LCD module, it is difficult to seek for the low power consumption which is demanded with respect to a notebook type personal computer or a portable terminal.

SUMMARY OF INVENTION

In the IPS type liquid crystal display device, there has been a task that the IPS type liquid crystal display device exhibits the smaller numerical aperture compared to the TN type liquid crystal display device and hence, it is necessary to enhance the numerical aperture. The IPS type liquid crystal display device also has a task that the brightness must be increased to cope with the video digital media. Further, the IPS type liquid crystal display device has a task that the low power consumption must be realized.

Further, inventors of the present application also have found a following new task. That is, when portions of the pixel electrodes or the common electrode are constituted of transparent conductors such as indium-tin-oxide (ITO), for example, light passes through a region of a fixed width from an end of the electrode and hence, the numerical aperture (transmissivity) can be substantially increased. However, when liquid crystal material is formed of positive-type material, liquid crystal molecules at an end portion have components which are erected with respect to a surface of a substrate due to applying of the electric field and are arranged obliquely with respect to the transmitting light and hence, a viewing angle becomes narrow and the wide viewing angle which is the characteristics of the IPS type liquid crystal display device is damaged.

Further, the present invention also copes with a task to suppress the increase of a leak current when the TFTs are turned off which is generated due to the increase of a light irradiation amount to semiconductor elements to cope with high brightness.

One of the advantages of the present invention is to improve or solve one or a plurality of these tasks. To describe some of advantages realize in any one of the present invention in detail, they are as follows. The first advantage is enable providing a liquid crystal display device which can arrange the holding capacitance in an increased quantity without deteriorating the numerical aperture (transmissivity) in an IPS type liquid crystal display device using low-temperature polisylicon TFTs as pixel TFTs. The second advantage is enable providing a liquid crystal display device which can enhance the numerical aperture (transmissivity) by dividing each pixel into four or more portions or increases the holding capacitance when the pixel electrodes or the common electrode are arranged on organic resin in an IPS type liquid crystal display device. The third advantage is enable providing a liquid crystal display device which can satisfy both of broad viewing angle characteristics and low voltage driving.

Other advantages and tasks of the present invention will be apparent in the specification of this application described hereinafter. To describe major examples of the present invention, they are as follows.

(1) In a lateral electric field liquid crystal display device including a liquid crystal layer sandwiched between a transparent first substrate and a transparent second substrate, wherein a plurality of gate lines and a plurality of drain lines which intersect the plurality of gate lines in a matrix array are formed over the first substrate, pixels are formed in respective regions surrounded by the plurality of gate lines and the plurality of drain lines, and each pixel includes a common electrode line, a common electrode, at least one TFT element and a pixel electrode to which a signal from the drain line which is selected in response to a signal from the gate line by the TFT element is electrically supplied, the common electrode is formed over the drain line by way of an insulation film and the pixel electrode has a comb-teeth shape and is formed over the same layer as the common electrode, at least one of comb-teeth shaped portions of the pixel electrode has a multi-layered structure, and a holding capacitance is formed by a pixel electrode which constitutes a lower layer out of the multi-layered pixel electrode and the common electrode line layer.

(2) In (1), the common electrode line is formed substantially parallel to the gate line, and the common electrode and the common electrode line are connected through apertured portions of an insulation film including the insulation film.

(3) In either one of (1) and (2), the pixel electrode which constitutes the lower layer is arranged on the other layer of the pixel electrode by way of an insulation film.

(4) In any one of (1) to (3), the liquid crystal display device includes at least four main light transmitting portions which are formed within one pixel along a transverse line extending between the neighboring drain lines, the pixel further includes a through hole portion through which the common electrode on the drain line and the common electrode line are connected therein, and the pixel electrode which is disposed close to the drain line arranged at a side remote from the through hole portion within the pixel forms the holding capacitance.

(5) In any one of (1) to (4), the TFT element is formed of polysilicon and an insulation film of the holding capacitance is formed of an inorganic insulation film which covers the gate line of the TFT element.

(6) In a lateral electric field liquid crystal display device including a liquid crystal layer sandwiched between a transparent first substrate and a transparent second substrate, wherein a plurality of gate lines and a plurality of drain lines which intersect the plurality of gate lines in a matrix array are formed over the first substrate, pixels are formed in respective regions surrounded by the plurality of gate lines and the plurality of drain lines, and each pixel includes a common electrode, at least one TFT element and a pixel electrode to which a signal from the drain line which is selected in response to a signal from the gate line by the TFT element is electrically supplied, the common electrode and the pixel electrode are formed over the same insulation film, and the pixel further includes a metal electrode which has a portion thereof superposed in a planar manner to a gap formed between the common electrode and the pixel electrode by way of an insulation film, and a potential equal to a potential applied to the common electrode or the pixel electrode is applied to the metal electrode.

(7) In (6), ends of patterns of the pixel electrodes and the common electrodes which are arranged on the insulation film are formed of a transparent electrode.

(8) In (6), the insulation film is formed of an organic insulation film made of acrylic resin or the like.

(9) In a lateral electric field liquid crystal display device including a liquid crystal layer sandwiched between a transparent first substrate and a transparent second substrate, wherein a plurality of gate lines and a plurality of drain lines which intersect the plurality of gate lines in a matrix array are formed over the first substrate, pixels are formed in respective regions surrounded by the plurality of gate lines and the plurality of drain lines, and each pixel includes a common electrode, at least one TFT element and a pixel electrode to which a signal from the drain line which is selected in response to a signal from the gate line by the TFT element is electrically supplied, a region of one pixel arranged between the neighboring drain lines includes at least four-divided apertured portions between the drain lines, and widths of the divided respective apertured portions are formed in the order of sum of widths of the electrodes disposed at both sides of each apertured portion.

(10) In a lateral electric field liquid crystal display device including a liquid crystal layer sandwiched between a transparent first substrate and a transparent second substrate, wherein a plurality of gate lines and a plurality of drain lines which intersect the plurality of gate lines in a matrix array are formed over the first substrate, pixels are formed in respective regions surrounded by the plurality of gate lines and the plurality of drain lines, and each pixel includes a common electrode, a common electrode line, at least one TFT element and a pixel electrode to which a signal from the drain line which is selected in response to a signal from the gate line by the TFT element is electrically supplied, the improvement is characterized in that a region of one pixel arranged between the neighboring drain lines includes at least four-divided apertured portions between the drain lines, the common electrode is formed over the drain line by way of an insulation film and the pixel electrode has a comb-teeth shape and is formed over the same layer as the common electrode, and at least one of the pixel electrodes has a multi-layered structure, and a holding capacitance is formed by a pixel electrode which constitutes a lower layer of the multi-layered pixel electrode and the common electrode line layer, and a width of the aperture portion between the pixel electrode which forms the holding capacitance and the common electrode on the drain line close to the pixel electrode is set wider than a width of other apertured portions.

(11) In a lateral electric field liquid crystal display device including a liquid crystal layer sandwiched between a transparent first substrate and a transparent second substrate, wherein a plurality of gate lines and a plurality of drain lines which intersect the plurality of gate lines in a matrix array are formed over the first substrate, pixels are formed in respective regions surrounded by the plurality of gate lines and the plurality of drain lines, and each pixel includes a common electrode, at least one TFT element and a pixel electrode to which a signal from the drain line which is selected in response to a signal from the gate line by the TFT element is electrically supplied, a region of one pixel sandwiched between the neighboring drain lines includes at least four-divided apertured portions between the drain lines, and widths of the four-divided respective apertured portions differ from each other.

(12) In a lateral electric field liquid crystal display device including a liquid crystal layer sandwiched between a transparent first substrate and a transparent second substrate, wherein a plurality of gate lines and a plurality of drain lines which intersect the plurality of gate lines in a matrix array are formed over the first substrate, pixels are formed in respective regions surrounded by the plurality of gate lines and the plurality of drain lines, and each pixel includes a common electrode, at least one TFT element and a pixel electrode to which a signal from the drain line which is selected in response to a signal from the gate line by the TFT element is electrically supplied, the common electrode is formed over the drain line by way of an insulation film and the pixel electrode is formed of a transparent conductive body being formed over the same layer as the common electrode and having a width narrower than a width of the common electrode, and ends of the pixel electrode in the widthwise direction are shielded from light by a metal electrode which is arranged below the insulation film and to which a potential equal to a potential applied to the pixel electrode is applied.

(13) In (12), the width of the metal electrode is set wider than the width of the pixel electrode formed of the transparent conductor.

(14) In a lateral electric field liquid crystal display device including a liquid crystal layer sandwiched between a transparent first substrate and a transparent second substrate, wherein a plurality of gate lines and a plurality of drain lines which intersect the plurality of gate lines in a matrix array are formed over the first substrate, pixels are formed in respective regions surrounded by the plurality of gate lines and the plurality of drain lines, and each pixel includes a common electrode, at least one TFT element and a pixel electrode to which a signal from the drain line which is selected in response to a signal from the gate line by the TFT element is electrically supplied, a region of one pixel arranged between the neighboring drain lines includes at least four-divided apertured portions between the drain lines, and widths of the apertured portions are set to at least two or more different values, and the width of the apertured portion having a large sum of the widths of the electrodes arranged at both sides of the apertured portion is made wider than the width of the apertured portion having a small sum of the widths of the electrodes arranged at both sides of the apertured portion.

(15) In a lateral electric field liquid crystal display device including a liquid crystal layer sandwiched between a transparent first substrate and a transparent second substrate, wherein a plurality of gate lines and a plurality of drain lines which intersect the plurality of gate lines in a matrix array are formed over the first substrate, pixels are formed in respective regions surrounded by the plurality of gate lines and the plurality of drain lines, and each pixel includes a common electrode, at least one TFT element and a pixel electrode to which a signal from the drain line which is selected in response to a signal from the gate line by the TFT element is electrically supplied, the common electrode is formed over the drain line by way of an insulation film, the pixel electrode is formed over the same layer as the common electrode and is formed of a transparent conductive body having a width narrower than a width of the common electrode, and ends of the pixel electrode in the length direction are shielded from light by a metal electrode which is arranged below the insulation film and to which a potential equal to a potential of the pixel electrode is applied.

To mention further examples of the present invention, they are as follows.

To realize the first advantage of this invention, some examples are as follows.

Pixel electrodes which constitute portions for forming a display electric field and extend with a narrow width and common electrode potential portions which are superposed on the pixel electrodes by way of an insulation film are provided, and a holding capacitance is formed between the pixel electrodes extending with a narrow width and the common electrode potential portions.

The common electrodes for forming a holding capacitance extend below the pixel electrode by way of one insulation film and extend above the pixel electrodes by way of the other insulation film whereby the holding capacitance can be increased.

The common electrodes which extend above the pixel electrodes by way of the other insulation film are formed of a transparent electrode and are projected to cover at least one end of the extending pixel electrode so that the increase of the holding capacitance can be increased without sacrificing the numerical aperture.

To realize the second advantage of this invention, some examples are as follows.

Pixel which includes a connection region which connects the common electrode formed over the drain line and the common electrode or a reference signal line formed as a layer below the drain line via the through hole and four or more apertured portions between comb-shaped teeth in one pixel region, wherein a holding capacitance is formed by the pixel electrode having a comb-teeth shape and arranged opposite to the connection region and the common electrode.

Another examples for achieving the second advantage of the present invention lies in that, in the IPS display device having pixels each of which has four or more main aperture regions, as potentials for driving the liquid crystal of the main light transmitting portions, a potential of the common electrode on the drain line, a potential of the non-covered common electrode on the drain line which is connected to the common electrode, and a potential of the pixel electrode which forms the same layer as the common electrode on the drain line are provided. The advantageous effect can be enhanced by forming at least one or both of the common electrode and the pixel electrode using a transparent electrode.

Another examples for achieving the second advantage of the present invention lies in that, in the IPS display device in which each pixel has four or more light transmission regions between neighboring drain lines, the widths of all light transmission regions differ from each other. Particularly, by arranging the widths of the transmission regions in the reverse order of the sum of widths of comb-teeth at both sides of the transmission region, the maximum effective transmissivity can be obtained. Further, as the width of the pixel electrode, by setting the comb-teeth width of a portion of the comb-teeth which forms the holding capacitance out of the comb-teeth to a large value, it is possible to increase the capacitance to the maximum. By setting the distance between the common electrode which is formed above the drain lines by way of the insulation film and the comb teeth of the pixel electrode which form the holding capacitance to a large value, the second object can be obtained to the maximum.

To realize the third advantage of this invention, some examples are as follows.

At least one of the pixel electrode or the common electrode arranged on the insulation film is formed of the transparent electrode, at least one end portion of the extending comb teeth has a portion which is superposed on the electrode arranged as a layer below the transparent electrode while sandwiching the insulation film therebetween, and the electrode is shielded from light by the light-shielding metal electrode to which a potential equal to a potential applied to the transparent electrode is applied.

Further examples of the present invention will be apparent in the embodiments of the present invention which are explained hereinafter.

BRIEF DESCRIPTION OF THE DRAWINGS

FIG. 22A and FIG. 22B are charts showing the distribution of transmissivity on a cross section which transverses between neighboring drain lines in still another embodiment of the invention.

DESCRIPTION OF THE PREFERRED EMBODIMENTS

Figure 1:
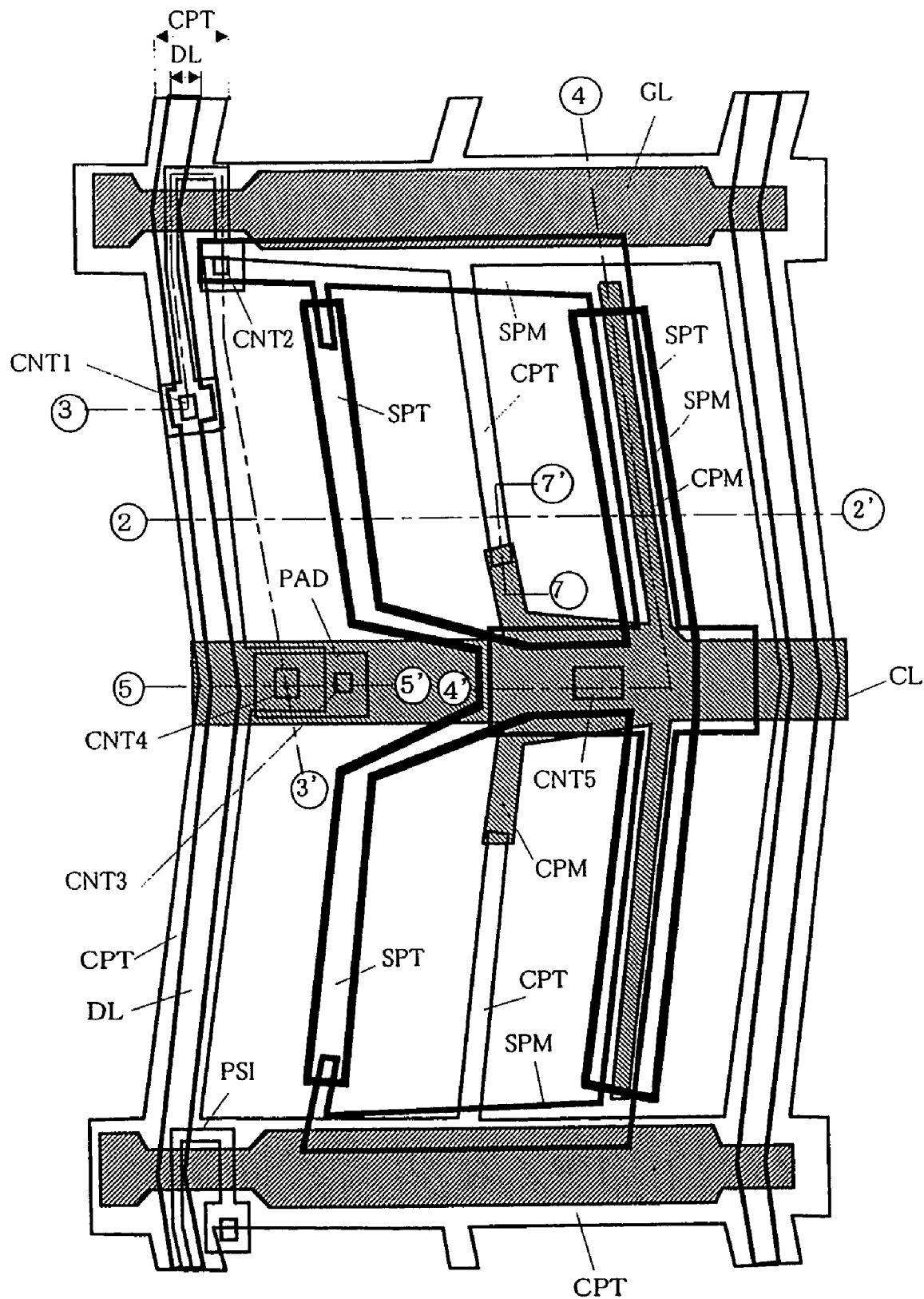
FIG. 1 is a plan view of an essential part of a pixel of a TFT liquid crystal display device according to one embodiment of the present invention.

Typical structures which constitute features of the present invention are explained hereinafter in conjunction with following embodiments.

Embodiment 1

FIG. 1 to FIG. 5 are a plan view and cross-sectional views of a pixel according to a liquid crystal display device of one embodiment of the present invention. FIG. 2, FIG. 3, FIG. 4 and FIG. 5 are cross-sectional views taken along cut lines indicated by chain lines as 2-2', 3-3', 4-4' and 5-5' respectively. In these drawings, to facilitate the cut portions in the drawings, numerals are surrounded by circles so as to indicate the cut portions. The drawings show essential parts for explanation purpose and orientation films are omitted from some drawings. Further, the counter-substrate-side constitution is also omitted from some drawings. Hereinafter, these drawings are explained in sequence.

FIG. 1 shows a schematic planar pattern of the pixel. One pixel is configured such that the pixel is surrounded by neighboring gate lines GL and neighboring drain lines DL. The gate line GL also functions as a gate electrode for a TFT which is constituted of a polysilicon PSI and supplies a voltage which turns on the TFT. The drain line DL supplies an electric current to the polysilicon PSI. That is, a video voltage (drain voltage) which is applied at the timing that the gate line GL supplies an ON voltage is supplied to the liquid crystal capacitance or the holding capacitance of one pixel and, eventually, the potentials of a metal pixel electrode SPM and a transparent pixel electrode SPT connected to the metal pixel electrode SPM assume the video potential.

The flow of the electric current leads to the polysilicon PSI from the drain line DL through a first contact hole CNT1 and the electric current which flows in the polysilicon PSI flows into the metal pixel electrode SPM through a second contact hole CNT2. Further, the electric current reaches a transparent pixel electrode SPT on the insulation film from the metal pixel electrode SPM through the fifth contact hole CNT5.

In FIG. 1, a width of the drain line DL is locally increased in the periphery of the contact hole CNT1 which connects the drain line DL and the polysilicon PSI. Due to such a constitution, the reduction of the connection resistance of the contact hole CNT1 and the stable contact between the drain line DL and the polysilicon PSI can be realized. It is needless to say that the width of the drain line DL at the periphery of the contact hole CNT1 may be made equal to the width of the drain line DL at other locations provided that the above-mentioned contact is normally performed.

A common electrode potential of another electrode which constitutes the liquid crystal capacitance or the holding capacitance together with the pixel electrode is applied through a following path. First of all, the common potential is applied to the common electrode line CL which is arranged at the approximately center between the neighboring gate lines GL. This potential is set to an approximately intermediate potential of the pixel potential which is alternated every frame (explained again in detail later in conjunction with FIG. 17). The potential of the above-mentioned common electrode line CL is, first of all, connected to an electrode pad PAD through a third contact hole CNT3. Further, the above-mentioned electrode pad PAD finally supplies the potential to a transparent common electrode CPT which covers the drain line DL and the gate line GL through an insulation film formed above the electrode pad PAD. While the liquid crystal capacitance or the holding capacitance is constituted by this pixel electrode potential and the common electrode potential, an electric field is generated in the inside of a liquid crystal layer due to the potential difference between these potentials whereby images are displayed due to the video voltage supplied from the drain line DL and the above-mentioned common voltage. The main light transmitting portions in FIG. 1 are four apertured portions formed along the line 2-2'.

Figure 2:
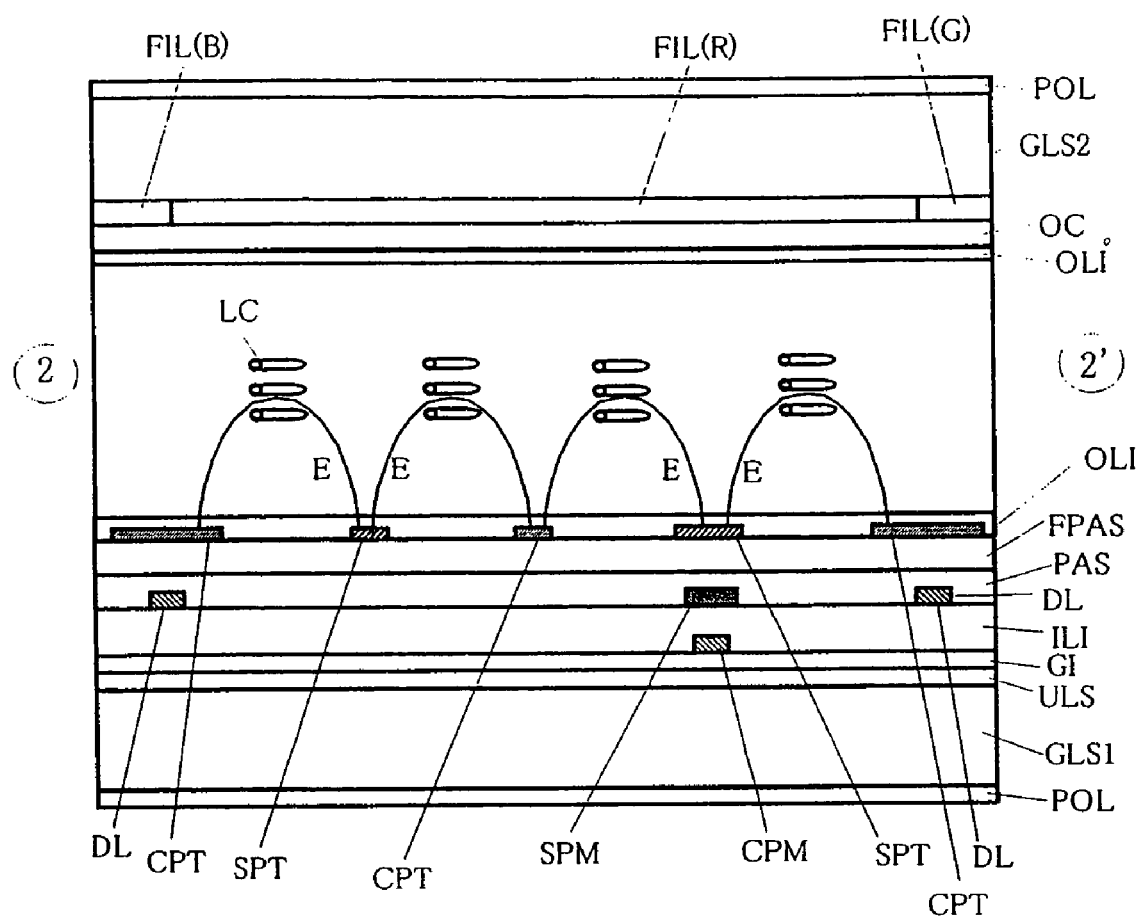
FIG. 2 is a cross-sectional view of an essential part of a pixel taken along a line 2-2' of the TFT liquid crystal display device according to one embodiment of the invention.

Hereinafter, the constitutions of respective parts are explained in detail in conjunction with the cross-sectional views. FIG. 2 is a cross-sectional view taken along a line 2-2' in FIG. 1 and shows a portion which traverses one pixel region between the neighboring drain lines DL. A substrate insulation film ULS which is constituted of an $Si_3N_4$ film having a film thickness of 50 mm and an $SiO_2$ film having a film thickness of 120 nm is formed over an alkali free TFT glass substrate GLS1 having a strain point of approximately 670 degree centigrade. The substrate insulation film ULS has a role of preventing the diffusion of impurities such as Na or the like from the TFT glass substrate GLS1. A gate insulation film GI which is formed of $SiO_2$ is formed over the substrate insulation film ULS. A metal common electrode CPM made of Mo or MoW or the like, for example, is formed over the gate insulation film GI. The metal common electrode CPM is formed by the same step and of the same material which are used for forming the gate line GL and the common electrode line CL in FIG. 1. The metal common electrode CPM is patterned in a form that the metal common electrode CPM is branched from the above-mentioned common electrode line CL.

An interlayer insulation film ILI made of $SiO_2$ is formed such that the film ILI covers all of the above-mentioned parts or members. The drain line DL formed of three-layered metal film such as Ti/Al/Ti is formed over the interlayer insulation film ILI.

Onto the drain line DL, a protective insulation film PAS made of $Si_3N_4$ having a film thickness of 200 nm and an organic insulation film FPAS containing acrylic resin as a main component and having a film thickness of 2 μm are applied. On the organic protective film FPAS, first of all, the transparent common electrode CPT made of indium tin oxide (ITO) and having a width wider than that of the drain line DL is formed. The transparent pixel electrode SPT which is formed by the same step and of the same material which are used for forming the transparent common electrode CPT is also formed over the organic insulation film FPAS.

In the above description, the materials for forming respective lines are not particularly limited.

The main transmission regions are four regions consisting of (1) a region formed between the transparent common electrode CPT on the drain line DL and the transparent pixel electrode SPT, (2) a region formed between the above-mentioned transparent pixel electrode SPT and the transparent common electrode CPT extending to the common electrode line CL side from the upper and lower gate lines GL in a plan view shown in FIG. 1, (3) a region formed between the above-mentioned transparent common electrode CPT and the transparent pixel electrode SPT which is arranged over the above-mentioned organic protective film FPAS such that the transparent pixel electrode SPT covers the metal common electrode CPM and the metal pixel electrode SPM, and (4) a region arranged between the transparent pixel electrode SPT and the transparent common electrode CPT arranged over the drain line DL. The above-mentioned transparent pixel electrode SPT and the transparent common electrode CPT constitute electrodes which drive the liquid crystal.

A substrate which faces the TFT glass substrate GLS1 in an opposed manner and seals liquid crystal LC together with the TFT glass substrate GLS1 is a color filter (CF) substrate GLS2. Color filters (FIL) which are constituted of organic film material dispersing pigments for performing color display at a liquid crystal side thereof are formed over the CF glass substrate GLS2. These color filters FIL express the transmitting lights of blue (B), red (R), green (G) corresponding to colors allocated to respective pixels. For example, the color filter which expresses the transmitting light of red (R) is indicated by FIL (R). On inner sides of these color filters FIL, an overcoat film OC made of organic material is formed. Although the overcoat film OC may be eliminated, it is desirable to enhance the flatness. Orientation films OLI are printed on respective surfaces of the CF glass substrate GLS2 and the TFT glass substrate GLS1 which are brought into contact with the liquid crystal LC and given rubbing is applied to these orientation films OLI so as to control the initial orientation direction of the liquid crystal LC. Further, to respective outer surfaces of the CF glass substrate CLS2 and the TFT glass substrate CLS1, polarizers POL are respectively laminated. These polarizers POL are formed in a so-called crossed Nicols state in which polarization axes cross each other between the glass substrates.

Figure 32:
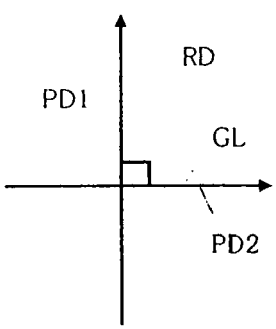
FIG. 32 is a view for explaining the relationship between a polarizer and an initial orientation direction according to one embodiment of the invention.

The relationship of angle between the rubbing direction and the polarization axes is shown in FIG. 32. One polarization axis PD2 is arranged in the same direction as the gate line GL and the other polarization axis is arranged in the direction perpendicular to the gate line GL. Further, the rubbing directions RD of both upper and lower substrates GLS1, GLS2 are arranged in the direction perpendicular to the gate line GL. Due to such a relationship, an arrangement of normally black mode is obtained. Further, a multi-domain is designed by adopting a bent-shape pixel pattern shown in FIG. 1. It is needless to say that a non-multi-domain is also included in the scope of the present invention. It is necessary to arrange the polarizers in crossed Nicols also in such a case.

One of the features of the cross-sectional structure of the present invention lies in that one pixel has at least four divided apertures (main transmission regions) with respect to the liquid crystal LC due to the transparent pixel electrode SPT and the transparent common electrode CPT on the organic insulation film FPAS.

Further, another feature lies in that, in a region where the transparent pixel electrode SPT is formed in a comb teeth shape, the metal pixel electrode SPM which is arranged below the transparent pixel electrode SPT constitutes the holding capacitance Cstg between the metal common electrode CPM which is arranged below the transparent pixel electrode SPT and the metal pixel electrode SPM by way of the insulation film ILI. Since the holding capacitance Cstg region is mainly formed of a metal electrode, there exists a problem that, along with the increase of the capacitance value, the numerical aperture is lowered. In the pixel shown in FIG. 1, the color filters FIL are arranged in a so-called longitudinal stripe and hence, a distance between the neighboring gate lines GL is set three times as large as a distance between the neighboring drain lines DL. Accordingly, by forming the holding capacitance Cstg below the transparent pixel electrode SPT which is extended parallel to the drain line DL while sandwiching the apertured portion at the inner side of the drain line DL shown in FIG. 1, it is possible to obtain the large capacitance value without reducing the numerical aperture.

Further, it is preferable that this extending holding capacitance Cstg is arranged below the transparent pixel electrode SPT which is remote from the electrode pad PAD which connects the transparent common electrode CPT and the common electrode line CL within the pixel. The reason is as follows. The metal pixel electrode SPM which extends from the second contact hole CNT2 of the TFT to the lower portion of the holding capacitance Cstg and the electrode pad PAD are formed by the same process and of the same material and hence, by arranging the holding capacitance Cstg below the transparent pixel electrode SPT remote from the electrode pad PAD, the interference of layouts can be obviated so that the holding capacitance Cstg can obtain the larger value.

Figure 3:
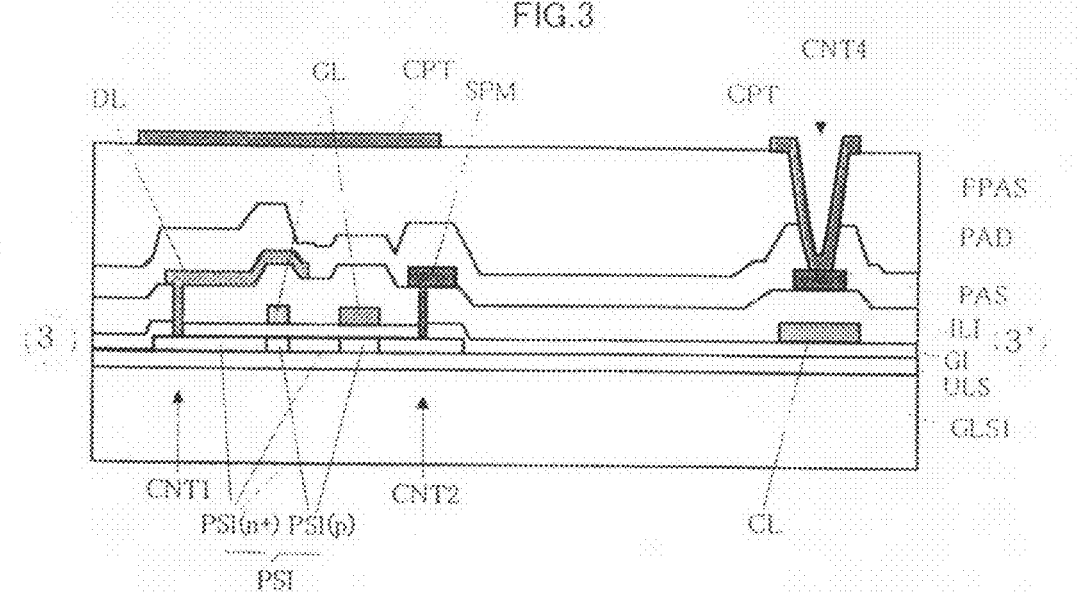
FIG. 3 is a cross-sectional view of an essential part of a pixel taken along a line 3-3' of the TFT liquid crystal display device according to one embodiment of the invention.

FIG. 3 is a cross-sectional view taken along a line 3-3' shown in FIG. 1. This cross-sectional view shows a cross section of the drain line DL—the first contact hole CNT1—the polysilicon layer PSI of the TFT—the second contact hole CNT2—electrode pad PAD formed over the common electrode line CL—a connection portion between the fourth contact hole CNT4 and the transparent common electrode CPT. The left side of the cross-sectional view in FIG. 3 shows the cross section of the TFT. The TFT constitutes a so-called MOS TFT in which the drain line DL and the metal pixel electrode SPM are used as so-called drain electrode and source electrode, the gate line GL is used as the gate electrode and the gate insulation film GI is provided. p-Si layers are formed over a background insulation film ULS. The drain line DL and the metal pixel electrode SPM are connected to a highly concentrated n-type layer PSI (n+) which is doped with phosphorus of low-temperature polysilicon PSI as impurities through the first contact hole CNT1 and the second contact hole CNT2 formed in the gate insulation film GI and the interlayer insulation film ILI. The highly concentrated n-type layer PSI (n+) is highly conductive and functions as a wiring portion in a pseudo manner. On the other hand, a p-Si island PSI below the gate line GL is constituted of a p-type layer PSI(p) doped with boron as impurities and functions as a so-called semiconductor layer. The p-type layer PSI(p) performs a switching operation in which the p-type layer PSI(p) becomes conductive with the gate line GL at an ON potential and becomes non-conductive at an OFF potential. When an ON voltage is applied to the gate line GL, below the gate insulation film GI which is arranged below the gate line GL, a potential formed at an interface of the p-type layer PSI(p) doped with boron as impurities with the gate insulation film GI is inverted so as to form a channel layer and the layer is converted into the n-type so that an ON current flows into the TFT and eventually an electric current flows into the metal pixel electrode SPM whereby the liquid crystal capacitance and the holding capacitance are charged.

In FIG. 1, the p-Si inland PSI is configured such that the p-Si inland PSI intersects the gate line GL at a right angle. This structure exhibits a contrast to the structure in which the drain line DL obliquely intersects the gate line. This is because that when the p-Si inland PSI obliquely intersects the gate line GL, a cross-sectional area of the channel portion of the p-Si inland PSI is enlarged excessively and hence, there may arise a case that the holding characteristics are deteriorated due to the increase of leaked current. Accordingly, in the structure shown in FIG. 1, the p-Si inland PSI intersects the gate line GL at a right angle thus minimizing the leaking of current structurally.

Figure 4:
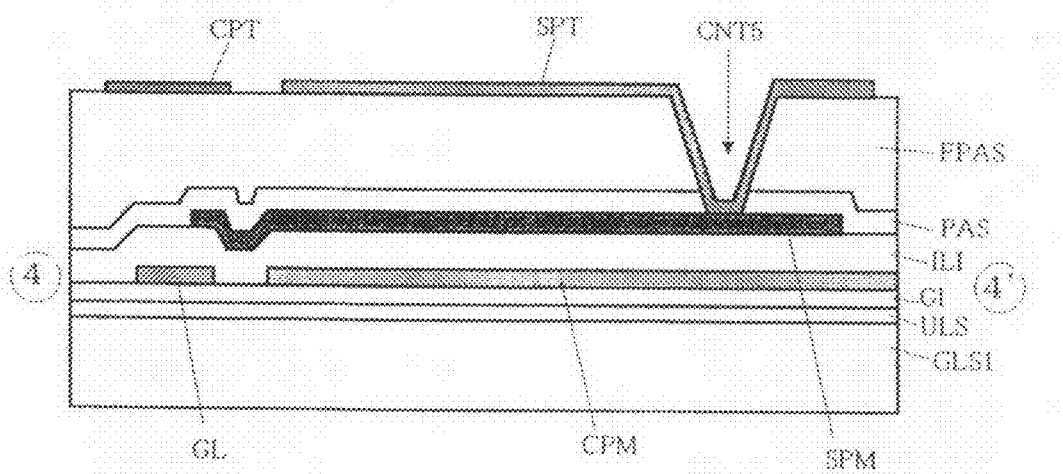
FIG. 4 is a cross-sectional view of an essential part of a pixel taken along a line 4-4' of the TFT liquid crystal display device according to one embodiment of the invention.

FIG. 4 is a cross-sectional view taken along a line 4-4' in FIG. 1. This cross-sectional view is a view along the transparent pixel electrode SPT at a side which mainly forms the holding capacitance Cstg. The holding capacitance Cstg is formed by adopting the metal common electrode CPM which is branched from the common electrode line CL and the common electrode line CL as one electrode, the metal pixel electrode SPM connected to the TFT as the other electrode, and an interlayer insulation film ILI as an insulation film. The transparent pixel electrode SPT is connected to the metal pixel electrode SPM via the fifth contact hole CNT5 formed in the organic protective film FPAS and the protective film PAS.

The superposed portion of the metal common electrode CPM, the metal pixel electrode SPM and the transparent pixel electrode SPT is constituted by laminating three or more layers, wherein as the layer is elevated, the width of the conductive layer is increased. Due to such a constitution, the influence of the potential of the lower layer can be surely shielded so that it is possible to prevent the influence of the lower layer from affecting the liquid crystal layer whereby the liquid crystal display device of high quality can be realized.

Figure 5:
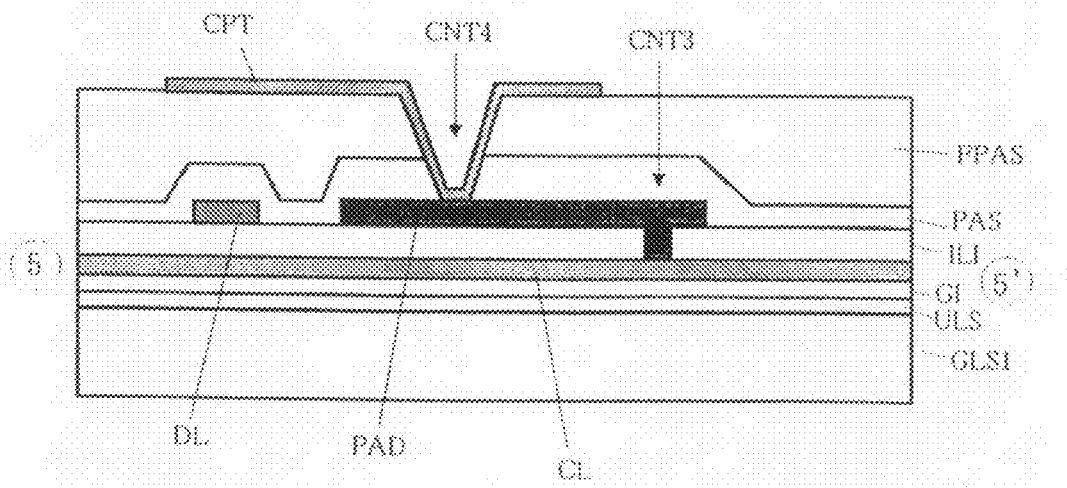
FIG. 5 is a cross-sectional view of an essential part of a pixel taken along a line 5-5' of the TFT liquid crystal display device according to one embodiment of the invention.

FIG. 5 is a cross-sectional view taken along a line 5-5' in FIG. 1. This cross-sectional structural portion is a portion where the potential of the common electrode line CL is connected to the electrode pad PAD through the third contact hole CNT3 and the electrode pad PAD is connected to the transparent common electrode CPT on the organic protective film FPAS. With respect to the electrode pad PAD according to this structure, when the transparent common electrode CPT and the common electrode line CL are directly connected to each other via the fourth contact hole CNT4, the depth of the contact hole CNT4 is increased and hence, there arises a problem that the etching selection ratio is reduced so that the rate that the transparent common electrode CPT is disconnected is increased. Accordingly, in the present invention, by sandwiching the electrode pad PAD which is formed by the same step and of the same material as the drain line DL between the transparent common electrode CPT and the common electrode line CL, it is possible to connect the transparent common electrode CPT and the common electrode line CL in a stable manner.

Figure 26:
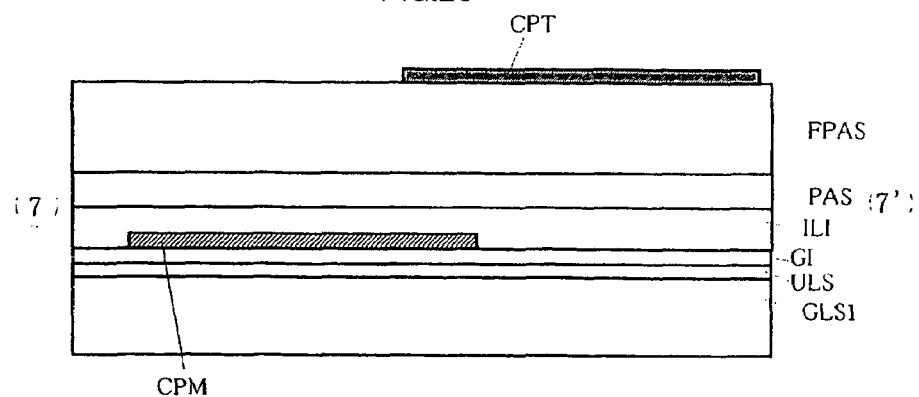
FIG. 26 is a cross-sectional view of an essential part of a pixel taken along a line 7-7' of a TFT liquid crystal display device according to one embodiment of the invention.

FIG. 26 is a cross-sectional view taken along a line 7-7' in FIG. 1, wherein an end portion of the transparent metal-made common electrode CPM and an end portion of the common electrode CPT formed of a transparent electrode are superposed each other. Due to such a constitution, in a region extending from the end of the transparent common electrode CPT to the common electrode line CL, a comb-teeth shaped common potential can be formed without generating a short-circuit with the transparent pixel electrode SPT so that the effective light transmission region can be enlarged whereby it is possible to obtain an advantageous effect that the numerical aperture can be increased.

Figure 6:
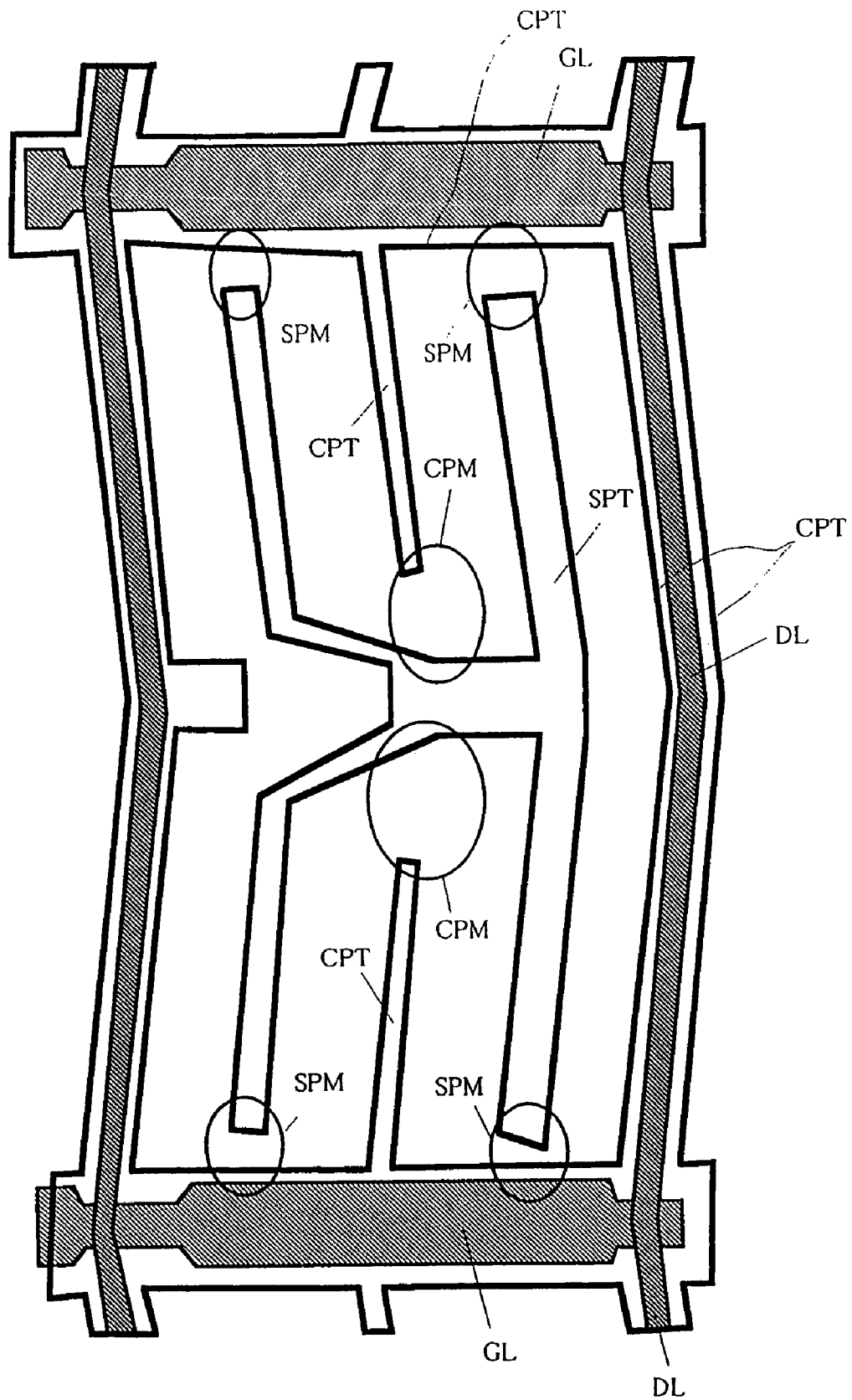
FIG. 6 is a plan view showing only layers of a gate line, a drain line, a transparent pixel electrode and a transparent common electrode in the pixel of the TFT liquid crystal display device according to one embodiment of the invention.
Figure 7:
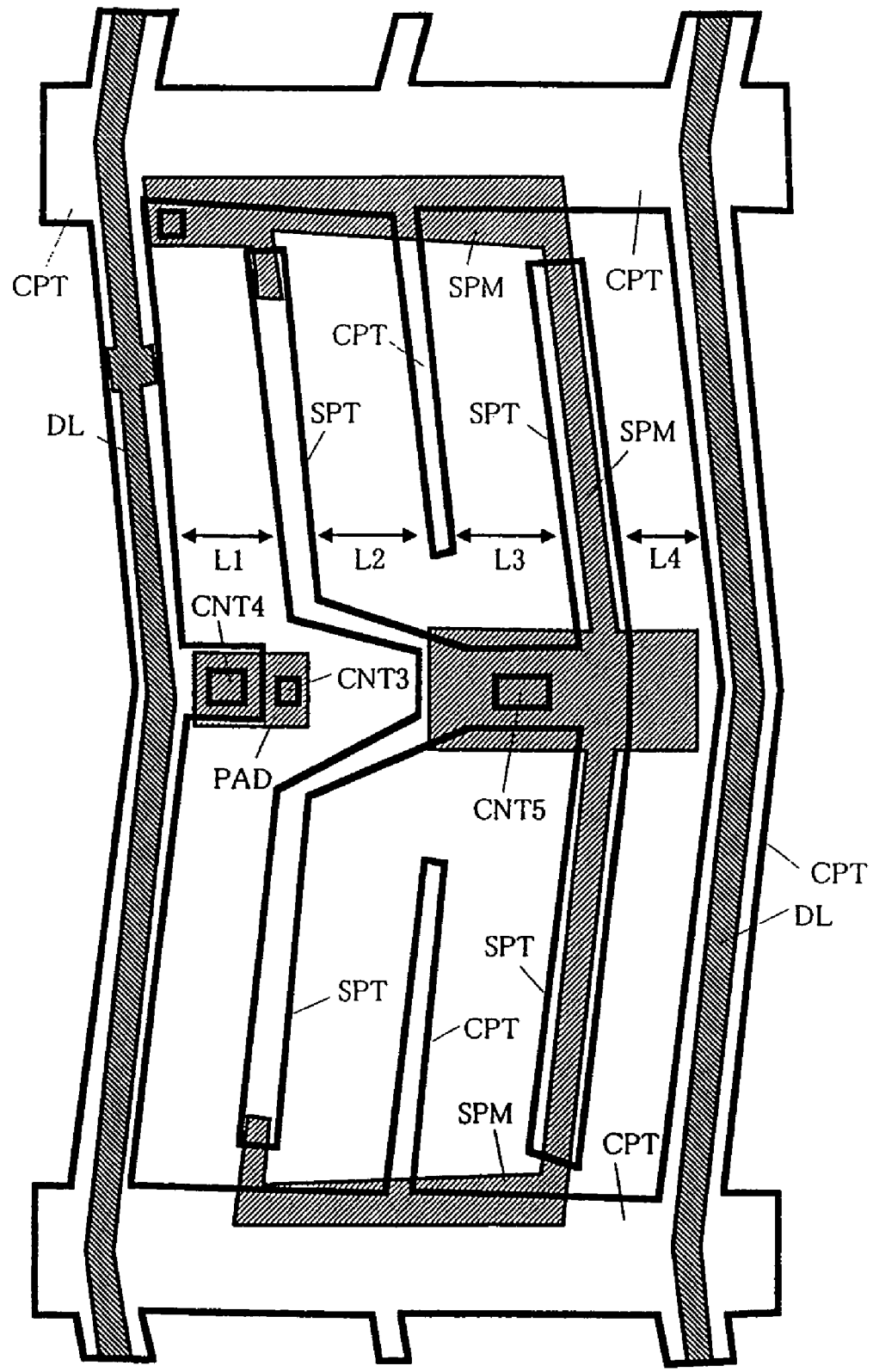
FIG. 7 is a plan view showing only layers of a drain line, a transparent pixel electrode and a transparent common electrode, a metal pixel electrode and an electrode pad in the pixel of the TFT liquid crystal display device according to one embodiment of the invention.

FIG. 6 and FIG. 7 are plan views of the pixel for clarifying the features of the embodiment 1. FIG. 6 is a view which describes only the gate lines GL, the drain lines DL and patterns of the transparent pixel electrode SPT and the transparent common electrode CPT arranged on the organic protective film FPAS which are sampled from a plurality of layers and parts which constitute the pixel. With respect to the structure explained in this embodiment, as can be clearly understood also from FIG. 2, both of the transparent pixel electrode SPT and the transparent common electrode CPT are formed over the organic protective film FPAS. Due to such a constitution, the driving voltage can be reduced compared to a structure in which an insulation film is sandwiched between the pixel electrode and the common electrode and an electric field for display is formed overly between these electrodes. This is because that an additional amount of driving voltage which becomes necessary due to the insulation film can be eliminated. However, since the transparent pixel electrode SPT and the transparent common electrode CPT are formed using the same step and the same material, it is necessary to provide a pattern which separates these electrodes from each other for preventing a short-circuit. To efficiently perform a layout, in case of dividing the pixel into four or more portions, the transparent common electrode CPT is extended toward the inside from the transparent common electrode CPT which covers the gate line GL and the transparent pixel electrode SPT may be arranged between them such that the transparent pixel electrode SPT is not connected to the transparent common electrode CPT. When the pixel is divided into four portions, the transparent pixel electrode SPT may be arranged in an X shape as shown in FIG. 6.

Further, in this structure, an exposure portion of the organic protective film FPAS from the transparent electrodes in each pixel is formed as a continuing region. Due to such a constitution, it is possible to prevent the local concentration difference of an etchant at the time of etching the transparent electrodes within the pixel. This is because that the etchant can be circulated. Due to such a constitution, the etching performance of the transparent electrodes can be enhanced so that the irregularity in size can be reduced whereby the reduction of the irregularity of brightness can be realized. Further, by providing regions having bent patterns in the inside of each pixel and providing the continuous organic film exposure region to the outer periphery of the region, the adhesiveness of the orientation films is enhanced whereby it is possible to obtain the highly reliable structure which is hardly removed.

Further, in this embodiment, the initial orientation treatment is performed in the direction substantially perpendicular to the gate line GL by rubbing, for example. The drain line DL and the comb-teeth electrodes are bent at an angle of approximately 10 to 15 degree with respect to a perpendicular line extending in the upward and downward direction on the plan view. Due to such a constitution, a lateral electric field is generated in the liquid crystal molecules which are initially oriented in the upward and downward direction in FIG. 6 by applying a voltage difference between the pixel electrode and the common electrode, wherein since the comb-teeth electrodes are bent in the vertical direction, the direction of electric field is rotated in different directions at an upper region and a lower region in FIG. 6 thus realizing a multi-domain effect. However, in regions surrounded by a circle in FIG. 6, the transparent pixel electrode SPT and the transparent common electrode CPT are separated and hence, the electric field along the direction of the gate line GL is not applied to the region but the electric field in the upward and downward (vertical) direction is applied to the region so that the rotation of the liquid crystal molecules is disturbed. Accordingly, a so-called disclination is generated so that the transmissivity is reduced or the response is delayed. Accordingly, in the present invention, the lateral electric field having a component in the direction of the gate line GL is also applied to these portions so as to suppress the generation of the disclination. For this end, regions of the transparent pixel electrode SPT and the region of the transparent common electrode CPT which face each other in an opposed manner while being spaced from each other and are surrounded by the circle in FIG. 6 are shielded from light by means of the metal pixel electrode SPM and the metal common electrode CPM arranged below the organic protective film FPAS so that the generation of the disclination is prevented whereby the transmissivity is enhanced and the effective numerical aperture is increased. By adopting metal electrodes having the same potential as the transparent comb-teeth pixel electrode SPT or the transparent common electrode CPT as the electrode which shields light, the above-mentioned advantageous effect is further enhanced. That is, by forming an extension portion using the metal electrode having the same potential as the comb-teeth and portions and shielding light using such extension portions, the liquid crystal display device is operated as if the comb-teeth electrode is directly extended whereby the region which is effectively operated can be enlarged.

Further, this embodiment provides the liquid crystal display device in which the upper-layer electrode and the lower-layer electrode constitute the same electrode. Accordingly, two regions which differ in B-V curve can be formed with respect to the same electrode and hence, the influence derived from irregularities in manufacturing can be reduced so that the irregularities among products and the influence of in-plane processing irregularities can be reduce whereby the display device with least brightness irregularities can be realized.

Further, electricity is supplied to the upper-layer electrode and the lower-layer electrode not only via through holes but also due to the capacitive coupling. Accordingly, even when disconnection is generated at a position remote from the through hole and the supply of electricity via the through hole is stopped by a chance, the normal potential can be supplied to the comb-shaped electrode due to the capacitive coupling so that the redundant structure is formed whereby the improvement of the yield rate can be also realized.

FIG. 7 is a plan view showing the arrangement of the metal pixel electrode SPM which also functions as a slight shielding electrode. The layout of the metal pixel electrode SPM is made as follows. That is, the metal pixel electrode SPM shields light transmitting through a gap between the transparent common electrode CPT which covers the gate line GL of own stage in a form that the metal pixel electrode SPM is extended below the transparent pixel electrode SPT having the potential from the TFT and the transparent pixel electrode SPT. Further, the metal pixel electrode SPM shields light transmitting through a gap between the transparent common electrode CPT which covers the gate line of next stage in a form that the metal pixel electrode SPM extends below one transparent pixel electrode SPT and the transparent pixel electrode SPT. This metal pixel electrode SPM which extends in such a manner has an advantageous effect that the metal pixel electrode SPM can increase the holding capacitance Cstg as mentioned previously. Further, this metal pixel electrode SPM which detours adopts an arrangement which obviates the interference of pattern with the electrode pad PAD so that the holding capacitance Cstg can be further increased. Further, the short-circuit can be avoided and this contributes to the enhancement of the yield rate.

Further, since the electrode pad PAD is formed of light-shielding metal material, leaking of light around the TH can be shielded thus enhancing the contrast ratio.

Subsequently, the manufacturing steps of the NMOS type TFT shown in FIG. 3 is explained in conjunction with FIG. 8 to FIG. 12 and FIG. 3.

After cleaning the alkali free TFT glass substrate GLS1 having a thickness of 0.7 mm, a size of 730 mm.times.920 mm and having a strain point of approximately 670 degree centigrade, the background insulation film ULS consisting of an $Si_3N_4$ film and an $SiO_2$ film is formed over the alkali free TFT glass substrate GLS1 by lamination. That is, first of all, the $Si_3N_4$ film having a film thickness of 50 nm is formed by a plasma CVD method using a mixed gas of $SiH_4$, $NH_3$ and $N_2$ and, thereafter, the $SiO_2$ film having a film thickness of 120 nm is formed by a plasma CVD method using a mixed gas of tetraethoxysilane and $O_2$. The insulation film ULS is provided for preventing the diffusion of Na from the TFT glass substrate GLS1 to the polycrystalline silicon film. The formation temperature of both of the $Si_3N_4$ and $SiO_2$ film is 400 degree centigrade. Here, although the polycrystalline silicon is representatively used as the semiconductor layer, the semi-conductor layer may be formed of macro-crystalline silicon, continuous grain boundary silicon or amorphous silicon.

Subsequently, an approximately intrinsic hydrated amorphous silicon film having a film thickness of 50 nm is formed by a plasma CVD method using a mixed gas of $SiH_4$ and Ar. The film forming temperature is 400 degree centigrade and the hydrogen quantity immediately after film forming is approximately 5 at %. Subsequently, the substrate is annealed for approximately 30 minutes at a temperature of 450 degree centigrade so as to dissipate hydrogen in the hydrated amorphous silicon film. The hydrogen quantity after annealing is approximately 1 at %.

Subsequently, an excimer laser beam LASER having a wave length of 308 nm is irradiated to the amorphous silicon film at a fluence of 400 $mJ/cm^2$ so as to melt and recrystallize the amorphous silicon film thus obtaining the approximately intrinsic polycrystalline silicon film. Here, the laser beam has an elongated line shape of a width of 0.3 mm and a length of 200 mm. The laser beam is irradiated to the substrate by moving the substrate at a pitch of 10 μm in the direction substantially perpendicular to the longitudinal direction of the beam. The irradiation is performed in the nitrogen atmosphere.

Figure 8:
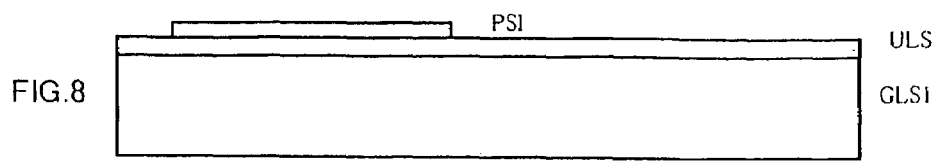
FIG. 8 is a cross-sectional view for explaining a manufacturing method of a TFT substrate of the TFT liquid crystal display device according to one embodiment of the invention up to the completion of the first photolithography step.

A given resist pattern is formed over the polysilicon film PSI by a usual photolithography method and the polysilicon film PSI is formed into a given shape by a reactive ion etching method using a mixed gas of $CF_4$ and $O_2$ (FIG. 8).

Subsequently, a $SiO_2$ film having a film thickness of 100 nm is formed by a plasma CVD method using a mixed gas of tetraethoxysilane and oxygen thus obtaining the gate insulation film GI. Here, the mixing ratio of tetraethoxysilane and oxygen is set to 1:50 and the film forming temperature is set to 400 degree centigrade. Subsequently, B ions are implanted at an acceleration voltage of 33 Kev and a dosed quantity of 1E12 $(cm^{-2})$ by an ion implantation method so as to form the polysilicon film PSI(p) in the channel region of the n-type TFT.

Then, a metal line, that is, a Mo film or a MoW film, for example, having a film thickness of 200 nm is formed by a sputtering method and, thereafter, a given resist pattern is formed over the Mo film by a usual photolithography method. Thereafter, the Mo film is formed into a given shape by a wet etching method using a mixed acid thus obtaining the scanning line GL and the second common electrode line CL.

Figure 9:
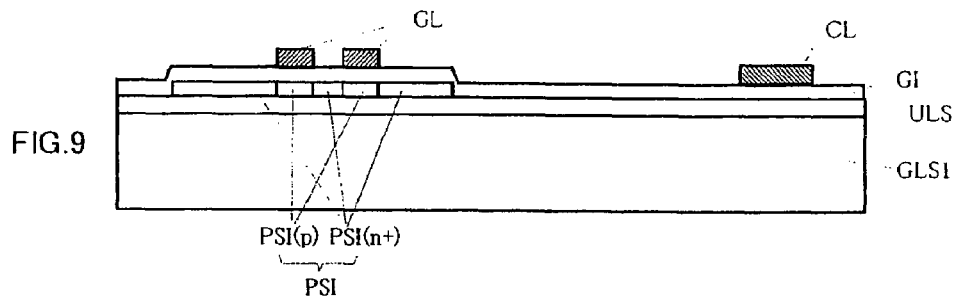
FIG. 9 is a cross-sectional view for explaining the manufacturing method of the TFT substrate of the TFT liquid crystal display device according to one embodiment of the invention up to the completion of the second photolithography step.

While leaving the resist pattern used for etching as it is, P ions are implanted at an acceleration voltage of 60 Kev and a dosed quantity of 1E15 $(cm^{-2})$ by an ion implantation method so as to form the source and drain regions PSI(n+) of the n-type TFT (FIG. 9). Although the n-type TFT in which the source and drains are respectively formed of the (n+)-type low-temperature polysilicon film PSI(n+) and the polysilicon film PSI(p) of p-type channel region is formed in accordance with the above-mentioned steps, it is possible to reduce a leaking current of the TFT by forming an n-type LDD region whose P ion concentration is smaller than that of the (n+)-type region between the p-type region and the (n+)-type region (not shown in the drawing). That is, after removing the resist pattern used for etching, P ions are implanted again at an acceleration voltage of 65 Kev and a dosed quantity of 2E13 (cm-2) by an ion implantation method so as to form the LDD region of the n-type TFI The length of the LDD region is determined based on a side etching quantity at the time of performing the wet etching of Mo. In this embodiment, the length of the LDD region is approximately 0.8 μm. The length can be controlled by changing the over-etching time of Mo.

Subsequently, the implanted impurities are activated by a rapid thermal annealing (RAT) method which irradiates light of an excimer lamp or a metal halide lamp to the substrate. By performing annealing using light which contains a large quantity of ultraviolet rays irradiated from the excimer lamp or the metal halide lamp, it is possible to selectively heat only the polysilicon layer PSI so that any damage which may be caused by heating the glass substrate can be obviated. The activation of the impurities may be performed by the heat treatment at a temperature of approximately 450 degree centigrade provided that shrinkage, bending or the like of substrate is small so that they do not cause any problem (FIG. 9).

Subsequently, an $SiO_2$ film having a film thickness of 500 nm is formed by a plasma CVD method using a mixed gas of tetraethoxysilane and oxygen thus obtaining an interlayer insulation film ILI. Here, a mixing ratio of tetraethoxysilane and oxygen is 1:5 and the film forming temperature is 350 degree centigrade.

Figure 10:
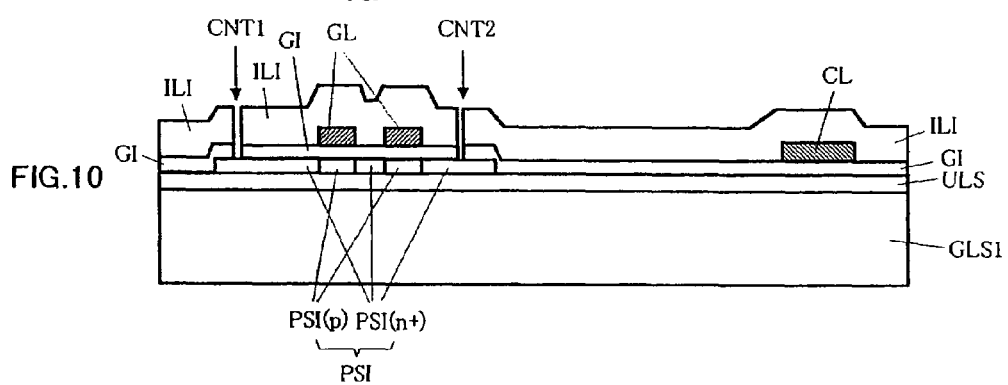
FIG. 10 is a cross-sectional view for explaining the manufacturing method of the TFT substrate of the TFT liquid crystal display device according to one embodiment of the invention up to the completion of the third photolithography step.

Then, after forming a given resist pattern, by a wet etching method using a mixed acid, the first contact through hole CNT1, the second contact through hole CNT2 and the third contact through hole CNT3 shown in a plan view of FIG. 1 are formed in the above-mentioned interlayer film (FIG. 10).

Figure 11:
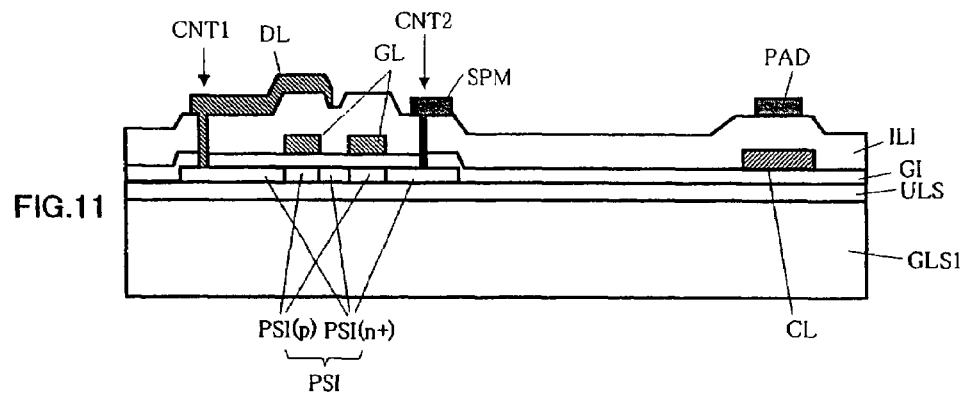
FIG. 11 is a cross-sectional view for explaining the manufacturing method of the TFT substrate of the TFT liquid crystal display device according to one embodiment of the invention up to the completion of the fourth photolithography step.

Subsequently, by a sputtering method, a Ti film having a film thickness of 50 nm, an Al—Si alloy film having a film thickness of 500 nm and a Ti film having a film thickness of 50 nm are sequentially formed by lamination. Then, a given resist pattern is formed. Thereafter, by a reactive ion etching method using a mixed gas of $BCl_3$ and $Cl_2$, a collective etching is performed thus obtaining the drain line DL, the metal pixel electrode SPM and the electrode pad PAD (FIG. 11).

Figure 12:
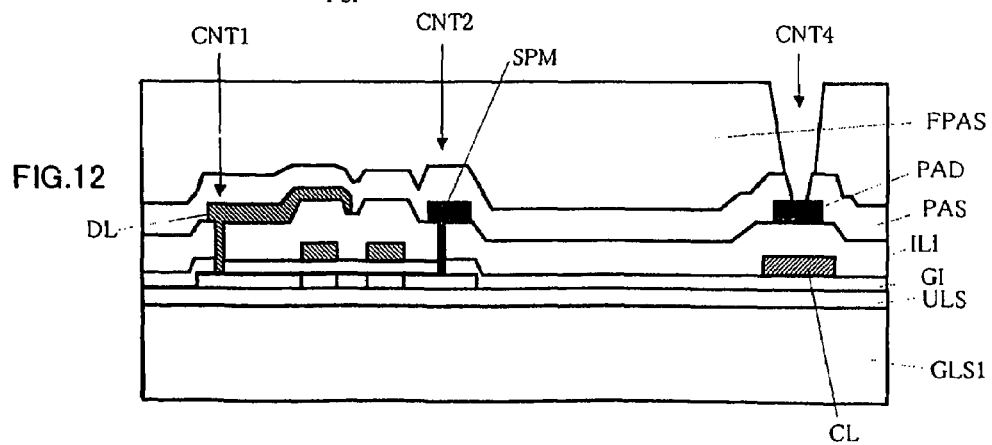
FIG. 12 is a cross-sectional view for explaining the manufacturing method of the TFT substrate of the TFT liquid crystal display device according to one embodiment of the invention up to the completion of the fifth photolithography step.

The protective film PAS which is a Si3N4 film having a film thickness of 300 nm is formed by a plasma CVD method using a mixed gas of $SiH_4$, $NH_3$ and $N_2$. Further, an acrylic photosensitive resin film having a film thickness of approximately 3.5 μm is applied by a spin coating method and exposure and development are performed using a given mask thus forming through holes in the acrylic resin. Then, the acrylic resin is baked for 20 minutes at a temperature of 230 degree centigrade thus obtaining the flattened organic protective film FPAS having a film thickness of 2.0 μm. Subsequently, using the through hole pattern formed in the organic protective film FPAS as a mask, the $Si_3N_4$ film arranged below the organic protective film FPAS is processed by a reactive ion etching method using CF4 thus forming the fourth contact hole CNT4 in the $Si_3N_4$ film (FIG. 12).

By processing the insulation film which constitutes the layer below the organic protective film FPAS using the organic protective film FPAS as a mask, films in two layers can be patterned in one photolithography step so that the entire steps can be simplified.

Finally, the transparent conductive film such as an ITO film having a film thickness of 70 nm is formed by a sputtering method. Then, by a wet etching using a mixed acid, the transparent conductive film is processed in a given shape thus forming the transparent common electrode CPT and the transparent pixel electrode SPT shown in a plan view of FIG. 1 whereby the active matrix substrate is completed (FIG. 3). As described above, the polycrystalline silicon TFT is formed by performing the photolithography steps 6 times in total.

Figure 13:
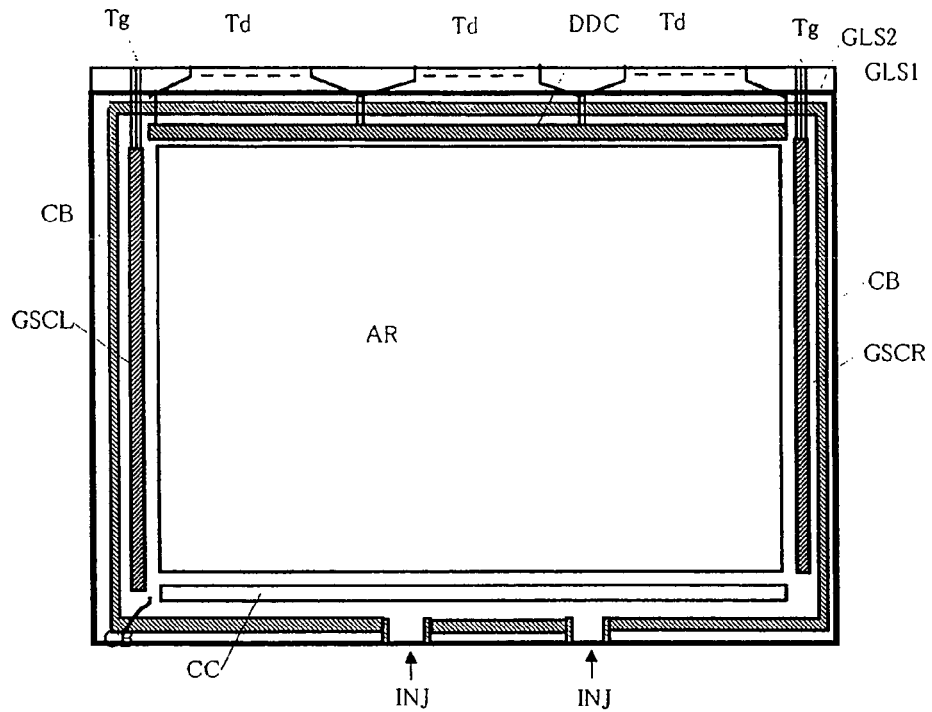
FIG. 13 is an overall plan view of an LCD cell which is formed by laminating a TFT glass substrate and a CF glass substrate to each other.

Subsequently, the planar structure of the overall appearance of the liquid crystal panel is explained. FIG. 13 is a view which shows a plan of an essential part around a matrix (AR) of a display panel including upper and lower glass substrates GLS1, GLS2. In manufacturing the panel, when the panel is of a small size, for enhancing the throughput, a plurality of devices are simultaneously processed on a sheet of glass substrate and, thereafter, the glass substrate is divided. On the other hand, when the panel is of a large size, for enabling the common use of a manufacturing installation, a glass substrate which is standardized for any types of panels is processed and is reduced into a size which matches each type of panel and the glass substrate is cut after making the glass substrate pass through a series of steps.

FIG. 13 shows the latter case and shows a state in which the upper and lower substrates GLS1, GLS2 are already cut. In both cases, in a completed state, the size of the upper substrate GLS2 is made smaller toward the inside than the lower side substrate GLS1 such that a portion (upper side in the drawing) where groups of external connection terminals Tg, Td are present is exposed. With respect to the groups of terminals Tg, Td, the group of terminals Tg are the connection terminals for power, supply and timing data which are supplied to a scanning circuit GSCL of the low-temperature polysilicon TFT which are arranged at left and right sides of the display region AR on the TFT glass substrate GLS1. The group of terminals Td are connection terminals for supplying video data or power source data to a video signal circuit DDC of the low-temperature polysilicon TFT formed over an upper portion of the display region AR of the TFT glass substrate GLS1. These groups of terminals are named by arranging lead line portions per tape carrier package TCP (FIG. 14) on which an integrated circuit chips CHI are mounted. The lead lines extending from matrix portions of respective groups to external connection terminal portions through the video signal circuit DDC are inclined as these lead lines approach both ends. Such an arrangement is provided for matching the arrangement pitch of the package TCP and the connection terminal pitch at respective packages TCP with the arrangement pitch of the video signal terminals Td of the display panel.

A seal pattern SL for sealing the liquid crystal LC is formed between the transparent glass substrates GLS1, GLS2 along peripheries of these substrates GLS1, GLS2 except for a liquid crystal filling port INJ. The sealing material is, for example, made of epoxy resin.

The orientation films ORI whose cross-sectional structure is shown in FIG. 2 are formed in the inside of the seal pattern SL. The liquid crystal LC is sealed in a region defined among the lower orientation film ORI and the upper orientation film ORI which set the direction of liquid crystal molecules and the seal pattern SL.

The liquid crystal display device is assembled such that various types of layers are laminated at the lower transparent TFT glass substrate GLS1 side and the upper transparent CF glass substrate GLS2 side separately, the seal pattern SL is formed at the substrate GLS2 side, the lower transparent glass substrate SUBI and the upper transparent glass substrate GLS2 are superposed each other, the liquid crystal LC is filled through the liquid crystal filling port INJ formed in the sealing material SL, the liquid crystal filling port INJ is plugged by epoxy resin or the like, and the upper and lower substrates GLS1, GLS2 are cut.

Figure 14:
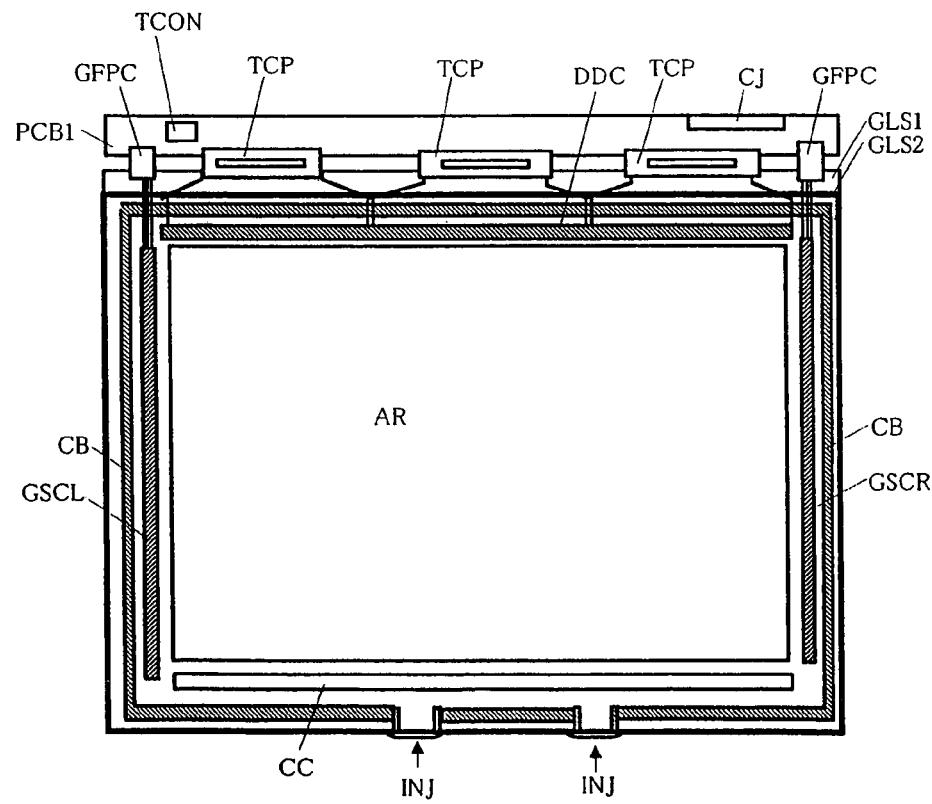
FIG. 14 is an overall plan view showing a state in which a PCB board and a TAB are connected to the LCD cell.

FIG. 14 is a plan view showing a state in which the tape carrier packages TCP which mount the video signal driving ICs on the display panel shown in FIG. 13 and the signal circuit DDC which is formed over the TFT substrate GLS1 using the low-temperature polysilicon TFT are connected to each other and a state in which the scanning circuit GSCL which is formed over the TFT substrate GLS1 using the low-temperature polysilicon TFT and the outside are connected to each other.

TCP indicates the tape carrier package on which driving IC chips are mounted by a tape automated bonding method (TAB) and PCB1 indicates a driving circuit board on which the above-mentioned TCP, a TCON constituting a control IC, a power supply amplifier, resisters, capacitors and the like are mounted. CJ indicates a connector connection portion for introducing signals and power supply from a personal computer or the like.

Figure 15:
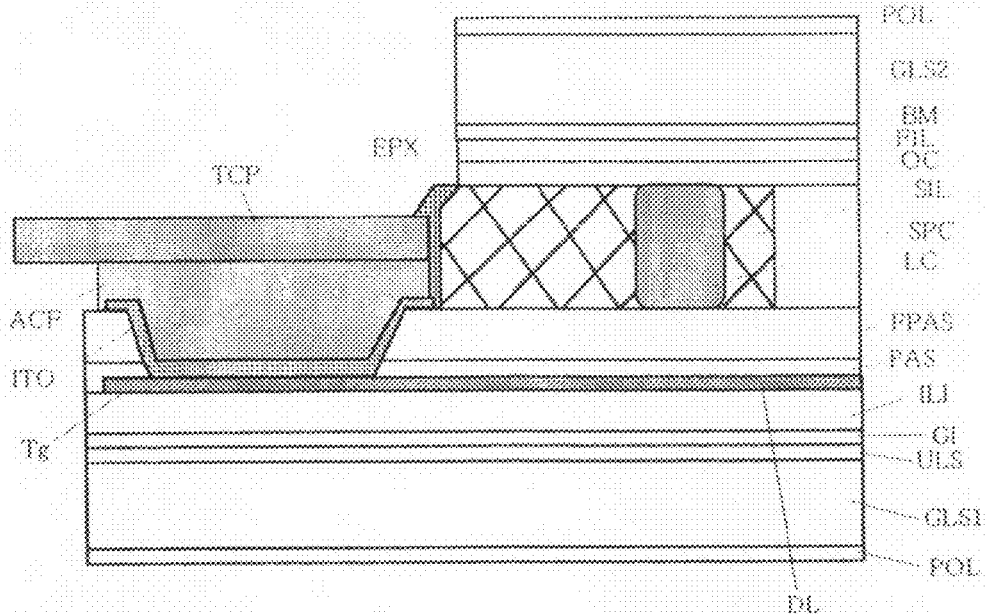
FIG. 15 is a cross-sectional view of the TAB of the LCD cell and a neighborhood of a drain-side pull-out terminal portion.

FIG. 15 is a cross-sectional view of an essential part showing a state in which the tape carrier package TCP is connected to the signal circuit terminal Td of the liquid crystal display panel. The tape carrier package TCP is connected to the liquid crystal display panel through an anisotropic conductive film ACF. Although the package TCP may preferably have a distal end portion thereof electrically connected to the connection terminal Td at the panel side, the fact is that the package TCP is connected to the transparent electrode ITO which is formed so as to cover an apertured portion formed in the protective film PAS and the organic protective film FPAS of the TFT and also is formed by the same step as the transparent common electrode CPT. The gap defined between the upper and lower glass substrates GLS1, GLS2 outside the seal pattern SL is protected by epoxy resin EPX or the like after cleaning. Silicone resin is further filled between the package TCP and the upper CF substrate GLS2 so as to ensure the multiple protection (not shown in the drawing). Further, the gap defined for filling the liquid crystal LC between the upper and lower glass substrates GLS2, GLS1 has a height thereof determined by support columns SPC formed of an organic film or fibers.

Figure 16:
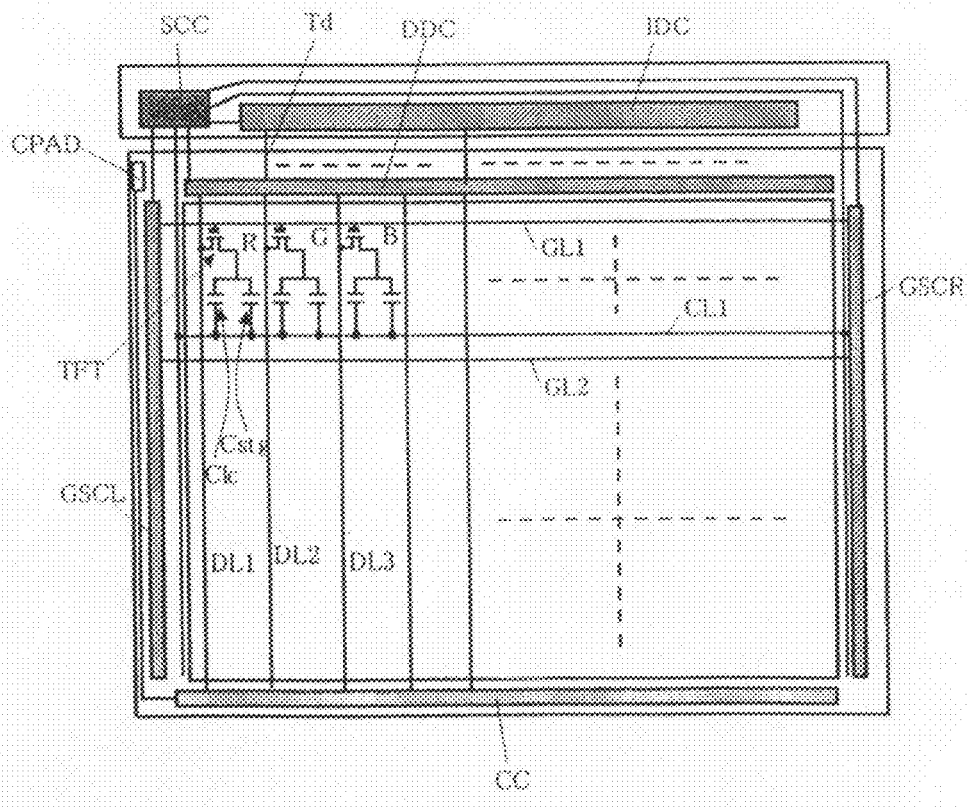
FIG. 16 is a plan view expressing a schematic equivalent circuit of the TFT liquid crystal display device.

A wiring chart between an equivalent circuit of a display matrix portion and a peripheral circuit around the equivalent circuit is shown in FIG. 16. In the drawing, DL indicates drain lines, wherein numerals in the symbols, DL1, DL2 and DL3 indicate the order of the arrangement of the drain lines (video signal, lines) within the screen from the left side of the screen. Suffixes R, G and B are respectively provided corresponding to red, green and blue pixels. GL indicates gate lines, wherein numerals in the symbols, GL1, GL2 and GL3 indicate the order of the arrangement of the gate lines within the screen from the upper side of the screen. Suffixes 1, 2 are added in accordance with the order of scanning timing. CL indicates common electrode lines, wherein numerals in CL1, CL2 indicate the order of arrangement of the common electrode lines within the screen from the upper side of the screen.

The gate lines GL (suffixes being omitted) are connected to the scanning circuit GSCL on the glass substrate and electricity and timing signals are supplied to the scanning circuit from a power supply and a timing circuit SCC which are formed over a printed circuit board PCB arranged outside the glass substrate. In the above-mentioned constitution, to the scanning circuit formed over the glass substrate which is constituted of the low temperature polysilicon TFT, electricity is supplied from both left and right sides with respect to one gate line (scanning line) to enhance the redundancy. However, electricity may be supplied to the scanning circuit from one side corresponding to the size of the screen or the like.

On the other hand, the supply of electricity is performed from the signal circuit DDC which is formed over the glass substrate and constituted of the low-temperature polysilicon TFT. The signal circuit DDC has a function of distributing the video data from the circuit constituted of the video signal circuit IC on the glass substrate in response to color data of R, G, B. Accordingly, the number of connection terminals from the signal circuit on the glass substrate is one third of the number of the drain lines within the screen.

Further, although the common lines CL supply the common potential of the pixels within the screen, an approximately fixed potential is applied according to the driving method of respective voltages in this embodiment 1 and hence, the common lines CL are pulled out to the left and right sides within the screen and are collectively bundled and, thereafter, are connected to the power supply and the timing circuit SCC.

The low-temperature polysilicon TFT within the screen is an N-type TFT. The display is performed by applying a gate voltage to the gate lines GL and by supplying a drain voltage (data) which is supplied to the drain lines DL at the timing of supplying the gate voltage to the liquid crystal capacitance Clc between the drain line DL and the common electrode lines CL. To enhance the ability to maintain the potential of the liquid crystal capacitance Clc during the display period, the holding capacitance Cstg is formed between the common electrode lines CL or the metal common electrodes CPM and the metal pixel electrode SPM shown in FIG. 4. CC indicates an inspection circuit formed of a low-temperature polysilicon TFT which inspects the disconnection of the drain lines DL. CPAD indicates an inspection terminal.

Figure 17:
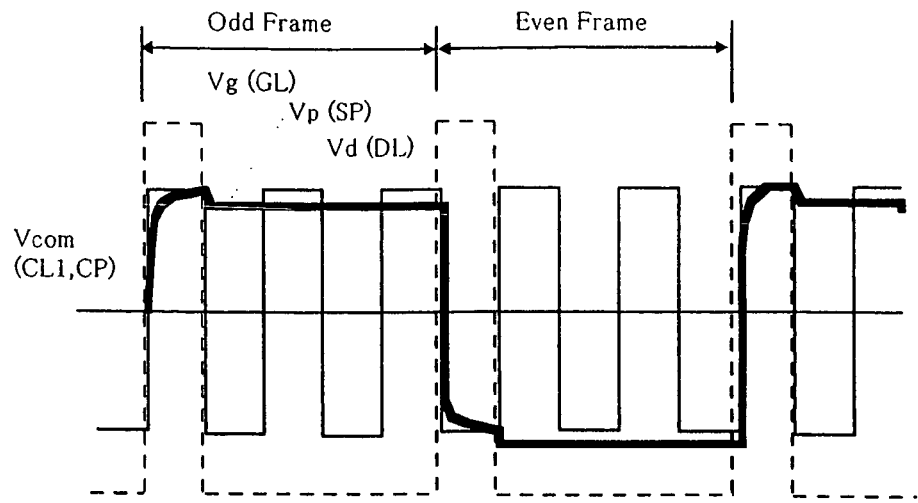
FIG. 17 is a timing chart expressing driving waveforms of the pixel of the TFT liquid crystal display device.

FIG. 17 shows driving wave forms of the liquid crystal display device of the present invention. FIG. 17 shows an example when the common electrode voltage Vcom is a direct current voltage. The gate voltage Vg sequentially scans every gate line. When a voltage obtained by adding a threshold voltage of the low-temperature polysilicon TFT of the pixel to the drain potential Vd is applied, the pixel TFT assumes an ON state and the gate voltage Vg is charged into the liquid crystal capacitance Clc shown in FIG. 16. The above-mentioned common electrode voltage Vcom, the gate voltage Vg, the drain voltage Vd are respectively applied to the common electrode line CL, the gate line GL and the drain line DL shown in FIG. 16. In this embodiment, the drain voltage Vd indicates a voltage which is used when a white display is performed at a liquid crystal display in a normal black mode, for example, wherein the gate line is selected every one line and the polarity is inverted to the plus side or the minus side with respect to the common electrode voltage Vcom every line. Although the pixel potential Vp is charged into the liquid crystal capacitance Clc through the TFT, the pixel potential Vp is inverted with respect to the common electrode potential Vcom at odd or even frames. With respect to the gate line GL of the TFT at a specific address, when the gate line GL is selected and the gate voltage Vg becomes larger than the drain voltage Vd, the potential corresponding to the images is charged into the liquid crystal capacitance Clc. However, as mentioned above, in the subsequent frame, the potential of liquid crystal capacitance Clc must be held until the drain voltage Vd inverted with respect to the common electrode potential Vcom is applied. This holding rate is lowered when an OFF (leak) current of the TFT is increased. To prevent the lowering of the holding rate, it is necessary to set the holding capacitance Cstg of the equivalent circuit shown in FIG. 16 to a large value. As can be understood from the planer and cross-sectional structures shown in FIG. 1, FIG. 2 and FIG. 4, the holding capacitance Cstg is constituted of the interlayer insulation film ILI disposed between the metal pixel electrode SPM and the metal common electrode CPM. With respect to the low-temperature polysilicon TFT having the planer structure, as can be understood from the cross-sectional structure shown in FIG. 3, a light-shielding metal is not provided below the polysilicon layer PSI. Accordingly, in the present invention, the influence of leaking current is reduced by increasing the holding capacitance Cstg thus preventing the lowering of the holding rate.

Figure 18:
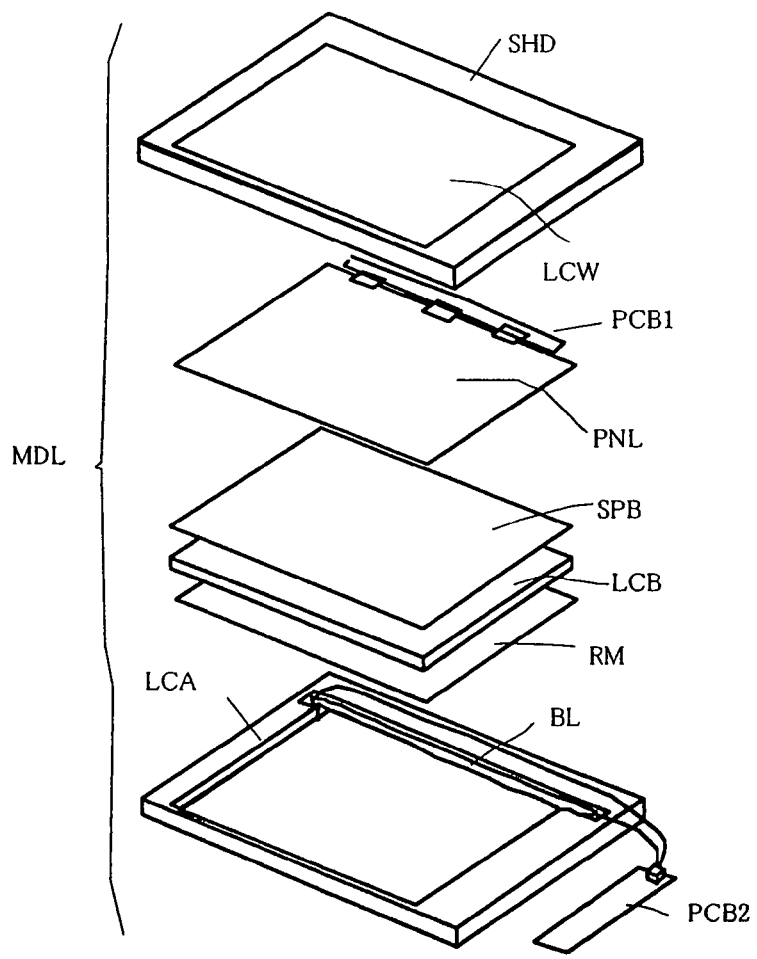
FIG. 18 is an explanatory view showing one example of the module constitution of the invention.

FIG. 18 is an exploded perspective view showing respective constitutional parts of a liquid crystal display module MDL. SHD indicates a frame-like shield case (metal frame) made of a metal plate, LCW indicates a display window of the shield case SHD, PNL indicates a liquid crystal display panel, SPB indicates a light diffusion plate, LCB indicates a light guide body, RM indicates a reflection plate, BL indicates a backlight fluorescent tube and LCA indicates a backlight case. the module MDL is assembled by laminating respective members in accordance with the vertical arrangement relationship shown in the drawing.

The module MDL has the whole structure thereof fixed by pawls and hooks mounted on the shield case SHD. The backlight case LCA is configured such that a backlight fluorescent lamp BL, the light diffusion plate SPB, the light guide body LCB and the reflection plate RM can be accommodated therein. Light emitted from the backlight fluorescent tube BL which is arranged along a side surface of the light guide body LCB is formed into a uniform backlight on a display screen through the light guide body LCB, the reflection plate RM and the light diffusion plate SPB and the backlight is irradiated to the liquid crystal display panel PNL side. The backlight fluorescent tube BL is connected to an inverter printed circuit board PCB2 which constitutes a power supply of the backlight fluorescent tube BL.

Embodiment 2

Figure 19:
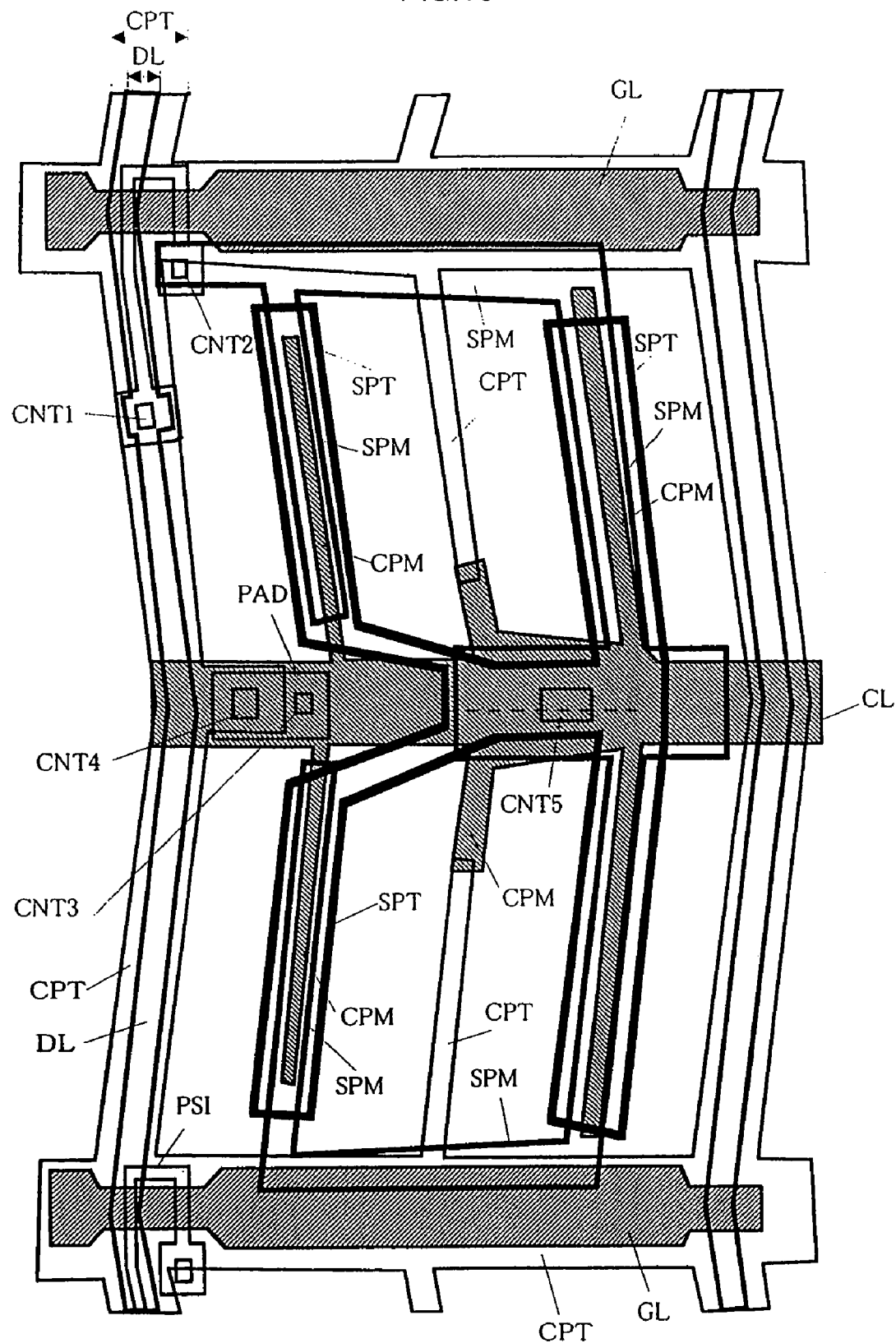
FIG. 19 is a plan view of a pixel of a TFT liquid crystal display device according to another embodiment of the invention.
Figure 20:
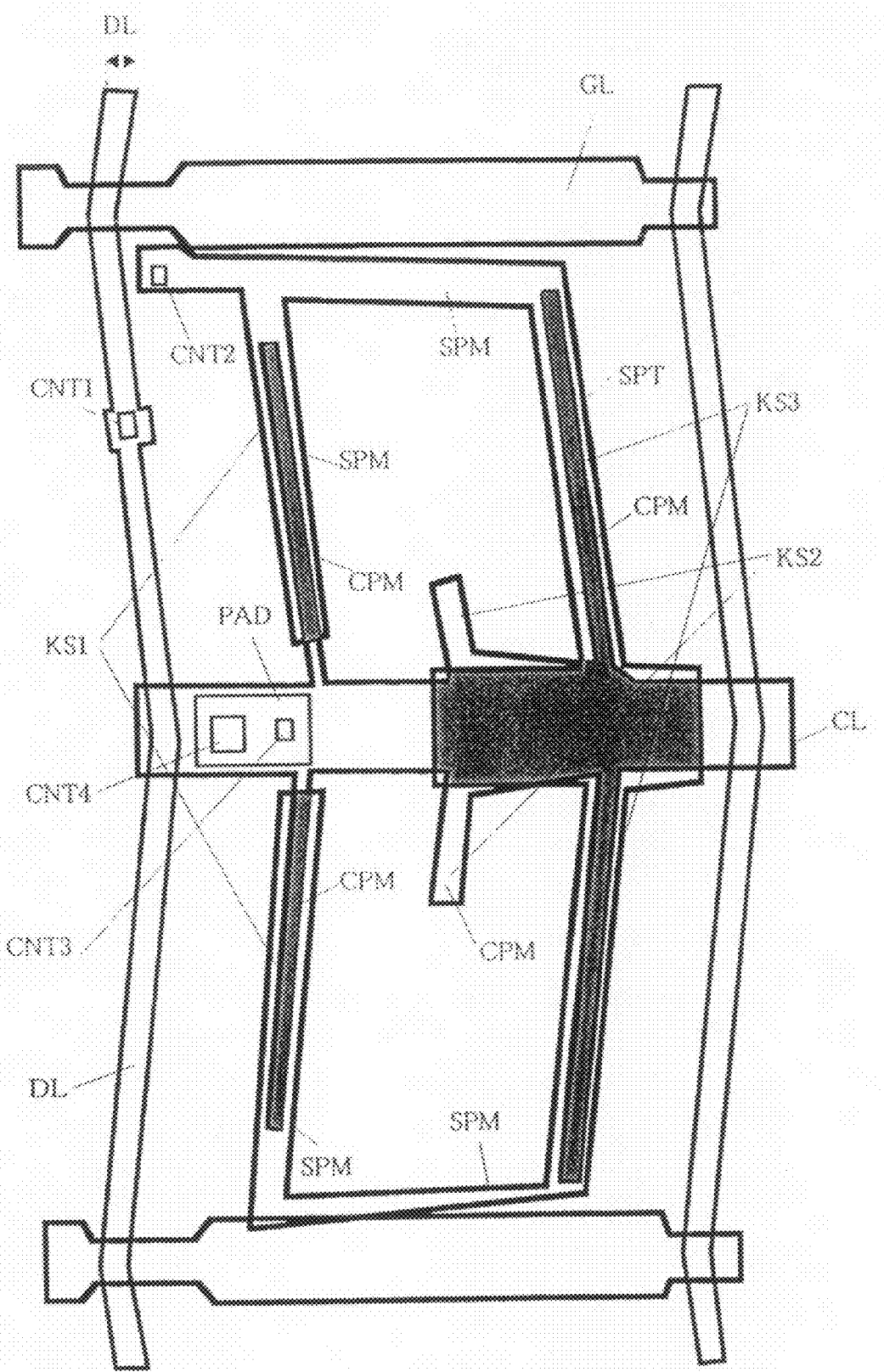
FIG. 20 is a plan view showing patterns of a metal pixel electrode and a common electrode of the pixel of a TFT liquid crystal display device according to another embodiment of the invention.

FIG. 19 is a plan view of a pixel showing the second embodiment of the present invention and FIG. 20 is a plan view which shows only a common electrode line CL, a metal common electrode CPM, gate lines GL and drain lines DL, and a pattern of a metal pixel electrode SPM within a planer pattern of one pixel for explicitly expressing advantageous effects of the second embodiment.

In the same manner as the embodiment 1, FIG. 19 shows the pixel pattern adopting the IPS method in which four main light transmitting portions are provided in the direction which traverses the drain lines DL. Although the constitution of this embodiment 2 is similar to the constitution of the embodiment 1, the main feature of this embodiment 2 lies in that even when the value of the holding capacitance Cstg is increased 1.5 times compared to that of the embodiment 1, the reduction of the numerical aperture can be prevented. The metal pixel electrode SPM which is connected to the second contact hole CNT2 of the TFT at the gate line GL (gate line of next stage) on which the TFT for driving the pixel is formed passes below the transparent common electrode CPT which is arranged such that the transparent common electrode CPT covers the gate line GL of next stage. The metal pixel electrode SPM extends below the transparent pixel electrode SPT arranged at a position disposed opposite to the electrode pad PAD with respect to the center line of the pixel. The metal pixel electrode SPM further passes the neighborhood of the gate line GL of next stage and extends again below other transparent pixel electrode SPT. On the other hand, the metal pixel electrode SPM in the neighborhood of the gate line GL of the next stage is branched and the branched metal pixel electrode SPM is directed toward the neighborhood of the electrode pad PAD and extends below the transparent pixel electrode SPT. The electrode pad PAD and the above-mentioned metal pixel electrode SPM are formed by the same step and of the same material. Because of the interference, they do not reach the common electrode line CL on the planar pattern.

On the other hand, the metal common electrodes CPM are branched from the common electrode line CL such that the metal common electrodes CPM are superposed on the metal pixel electrode SPM extending in a comb-teeth shape.

FIG. 20 shows a state in which the holding capacitance Cstg is increased in the above-mentioned pattern. In FIG. 20, the holding capacitance Cstg is formed by two electrode patterns. That is, one electrode pattern is formed of the metal pixel electrode SPM and the metal common electrodes CPM and the other electrode pattern is formed of the metal pixel electrode SPM and the common electrode line CL. In the drawing, regions expressed by hatching are portions where the metal pixel electrode SPM is superposed on the metal common electrodes CPM and the common electrode line CL. These regions constitute the holding capacitance Cstg forming portion which uses the interlayer insulation film ILI shown in the cross-sectional structure in FIG. 4 as an insulation film. Compared to the third comb teeth KS3 described in the embodiment 1, the holding capacitance Cstg is increased in the neighborhood of the first comb teeth KS1. To describe the feature on pattern of this embodiment, since the first comb teeth KS1 is formed by the same method and is formed of the same material as the electrode pad PAD and the metal pixel electrode SPM, the optimum pattern is obtainable due to the interference therebetween.

That is, this embodiment adopts the pattern in which the metal pixel electrodes SPM extend inwardly from the neighborhood gate lines GL toward the common electrode line CL and are not superposed on the common electrode line CL.

By adopting such a pattern, compared to the embodiment 1, below the whole transparent pixel electrode SPM in the comb-teeth shape (when divided into four portions, two pixel electrode comb teeth), the holding capacitance Cstg which adopts the metal common electrode CPM as one electrode and the metal pixel electrode SPM as the other electrode can be formed and hence, the holding capacitance Cstg can set a value thereof to a large value. Accordingly, it is possible to relatively decrease a leak quantity of charge held by the liquid crystal capacitance and the holding capacitance derived from the generation of leaking current which is caused by the irradiation of light generated by a large light source served for applications including a television set to the low-temperature polysilicon PSI and hence, it is possible to provide the bright display device which exhibits the stable holding characteristics.

Embodiment 3

Figure 21:
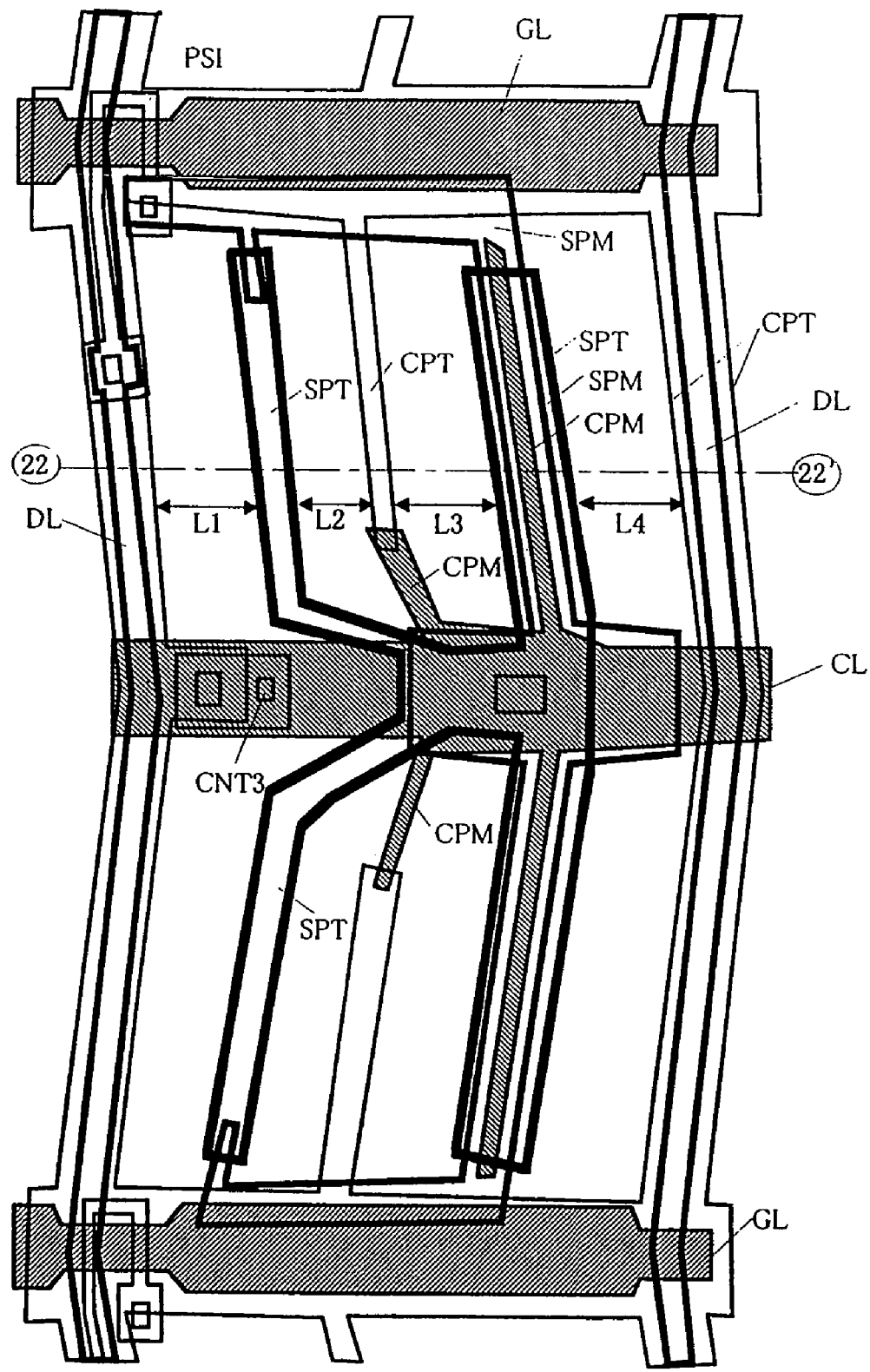
FIG. 21 is a plan view of a pixel of a TFT liquid crystal display device according to still another embodiment of the invention.

FIG. 21 is a plan view of the pixel according to the third embodiment of the present invention. FIG. 22 shows the distribution of transmissivity of main light transmitting portions between comb-teeth electrodes when the backlight is irradiated from below the TFT glass substrate GLS1 in the liquid crystal display device having a cross-sectional structure taken along a line 22-22' in a plan view of FIG. 21.

The planar pattern of the pixel shown in FIG. 21 is substantially equal to the planar pattern of the pixel of the embodiment 1 shown in FIG. 1. This embodiment differs from the embodiment 1 in that the distances L1, L2, L3, L4 which are sizes between comb-teeth electrodes of the main transmission region which is divided in four portions in the drawing are arranged such that the maximum transmissivity is obtained per one pixel, that is, as the liquid crystal display device, with respect to the width of the transparent common electrode CPT on the drain line DL and the width of the transparent pixel electrode SPT.

FIG. 22 shows the distribution of transmissivity on a cross-sectional view taken along a line 22-22' in FIG. 21, wherein FIG. 22A shows the distribution of transmissivity of the embodiment 1 and FIG. 22B shows the distribution of transmissivity of this embodiment. The width of the transparent pixel electrode SPT and the transparent common electrode CPT and the distance between these electrodes are described using μm as a unit. The size between the neighboring drain lines DL is set to 88 μm.

The relationship between the size and the transmissivity in FIG. 22A is explained in detail hereinafter. The width of the drain line DL is 8 μm and the width of the transparent common electrode CPT which covers the drain line DL on the organic insulation film FPAS is 16 82 m. The width of the transparent common electrode CPT is set large also for shielding leaking from the drain line DL to the pixel potential with respect to the drain line DL. The liquid crystal LC is driven by an electric field applied between the transparent pixel electrode SPT and the transparent common electrode CPT. The distance between the electrodes is set to equal with respect to the four main transmission widths L1, L2, L3, L4. The width of electrode is 5 μm except for the width of the transparent common electrode CPT on the drain line DL and the width of the transparent pixel electrode SPT which forms the holding capacitance Cstg. The width of the transparent pixel electrode SPT which forms the holding capacitance Cstg is set large by taking the alignment between the transparent pixel electrode SPT and the metal electrode SPM which forms the holding capacitance into consideration. Due to such a provision, it is possible to realize the more stable display. With respect to the transmissivity, when positive-type liquid crystal is used as the liquid crystal and the voltage applied to the liquid crystal is set to 5.5 V, the region L1 and the region L4 exhibit the highest value, then the L3 region exhibits the middle value, and the L2 region exhibits the lowest value. The display device of this embodiment adopts a so-called birefringence-type normal black display mode which exhibits a black display when an electric field is not applied to the pixels. This liquid crystal display device has characteristics that when a voltage is applied to the pixels, the light transmissivity is elevated and assumes the maximum value and when the voltage is further applied to the pixels, the light transmissivity is lowered to the contrary. The liquid crystal layer obtains the approximately maximum transmissivity with respect to the transmission regions L1, L4 and hence, assume that the applied voltage is further elevated to increase the transmissivity of the region L2, the transmissivity of the regions L1, L4 is lowered to the contrary so that the brightness of the liquid crystal display device per se is lowered.

In FIG. 22A, with respect to the region over the transparent pixel electrode SPT and the region over the transparent common electrode CPT, in spite of the fact that the respective electrodes use the transparent electrode such as ITO, their transmissivity is low. This is because that the IPS display method is a method which rotates the liquid crystal molecules by a lateral electric field generated between the pixel and the common electrode and hence, the neighborhood of the center of the width of the electrode constitute regions to which the electric field is not applied thus lowering the transmissivity. However, the lateral electric field is applied to the end portions of the electrodes in a fringe form and hence, even when the regions are over the ITO electrode, the liquid crystal molecules are rotated in the neighborhood of the end portions within a range of 1.5 μm from the end portions thus allowing the transmission whereby the transmissivity can be enhanced by forming only these portions of the electrode per se into the transparent electrode.

The constitution of the embodiment 3 shown in FIG. 22B can, compared to the constitution shown in FIG. 22A, enhance the transmissivity without changing the width of the electrode. The width of the transparent common electrode CPT on the drain electrode DL has a role of shielding the drain line DL and hence, the width is set large, that is, the width is set to 16 μm. Then, the width of the transparent pixel electrode SPT which constitutes the holding capacitance Cstg is set to 8 μm to form the holding capacitance Cstg. The width of other transparent electrodes is set narrow, that is, the width is set to 5 μm. The wider the width of the electrodes, the effective electric field applied to the apertured portions is increased. Accordingly, the distance L4 between the transparent pixel electrode SPT which constitutes the holding capacitance Cstg and the transparent common electrode CPT can be set to the largest value. Here, by setting the distance of L2 defined by the electrode width of 5 μm to the narrowest value, it is possible to arrange the voltage value which brings about the maximum transmissivity with respect to the maximum applied voltage so that the transmissivity can be enhanced by 30% while maintaining the numerical aperture to a fixed value (sum of electrode distances L1 to L4). In other words, in the design which fixes the transmissivity, it is possible to obtain an advantageous effect that the driving voltage can be reduced to 70%. That is, it is possible to improve the transmissivity or the driving voltage by setting the distances formed by dividing the pixel into four portions non-uniform. Particularly, it is possible to make the distance between the drain line DL and the pixel electrode which constitutes the holding capacitance Cstg assume the widest value.

To satisfy such a relationship, it is necessary to set a relationship in which the distance between electrodes in the apertured portion between electrodes at each pixel is set in the order of sum of widths of electrodes at both sides of the apertured portion. In the example shown in FIG. 22B, the sum of widths of electrodes at both sides is 21 with respect to the electrode distance L1, 10 with respect to the electrode distance L2, 13 with respect to the electrode distance L3 and 24 with respect to the electrode distance L4 and hence, the relationship of L2 portion<L3 portion<L1 portion<L4 portion is established. Accordingly, the distance between the electrodes may be set in the order of the sum of the distance between electrode, that is, L2<L3<L1<L4. In FIG. 22B, the relationship is set to 12.5<13.0<14.0<14.5. Due to such a relationship, it is possible to level the strength of electric field between electrodes so that the enhancement of transmissivity and the reduction of driving voltage can be realized.

Embodiment 4

Figure 23:
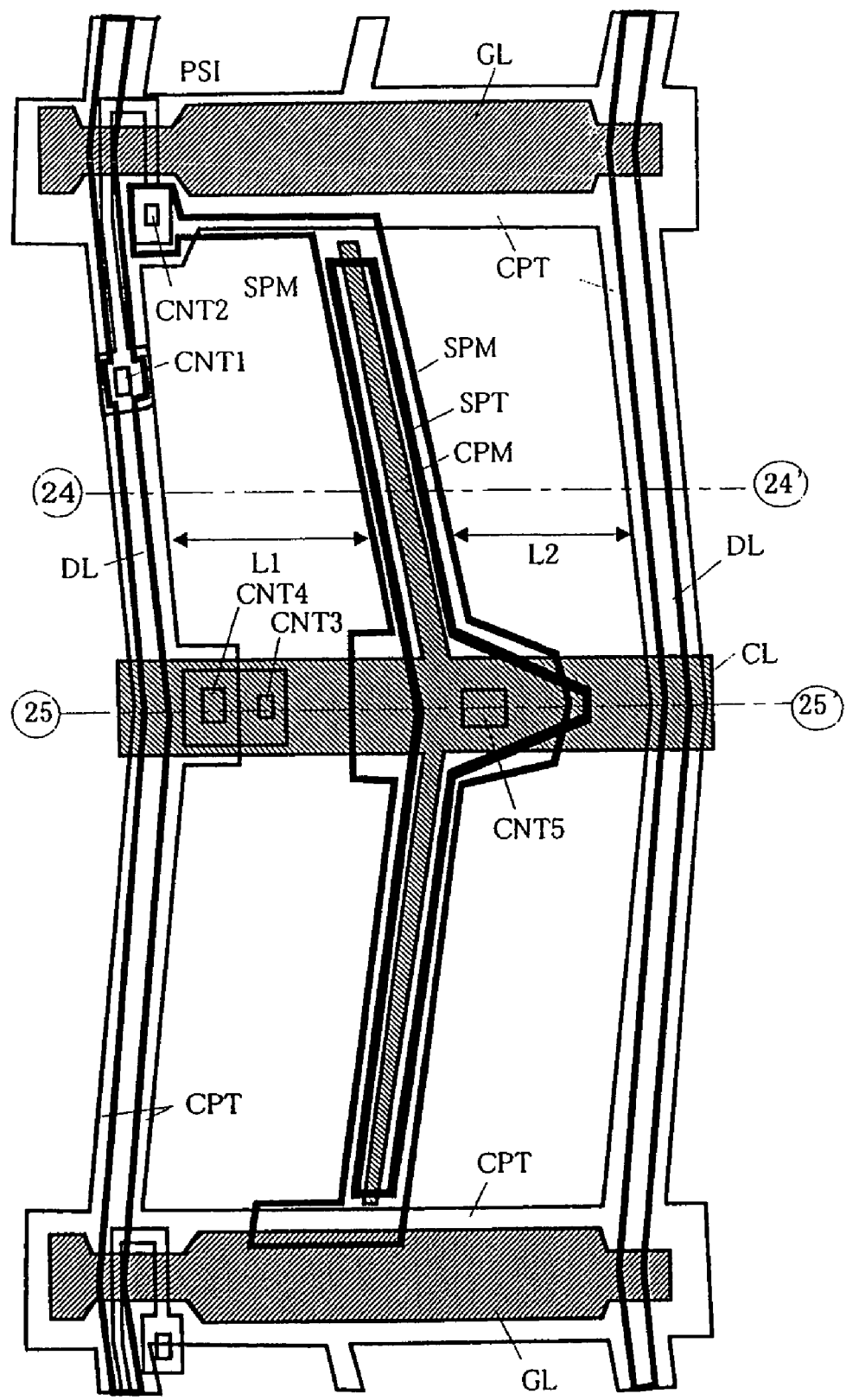
FIG. 23 is a plan view of a pixel of a TFT liquid crystal display device according to still another embodiment of the invention.
Figure 24A:
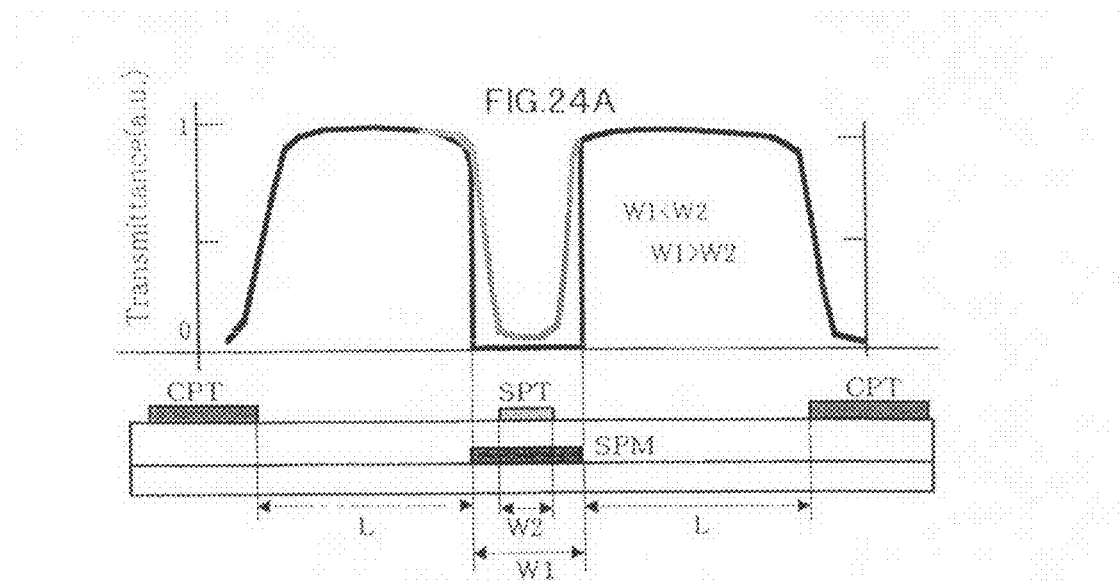
FIG. 24A is a chart showing the distribution of transmissivity of a cross section which transverses between neighboring drain lines in still another embodiment of the invention and FIG. 24B is a cross-sectional view of an essential part taken along a line 24-24' in FIG. 23.
Figure 24B:
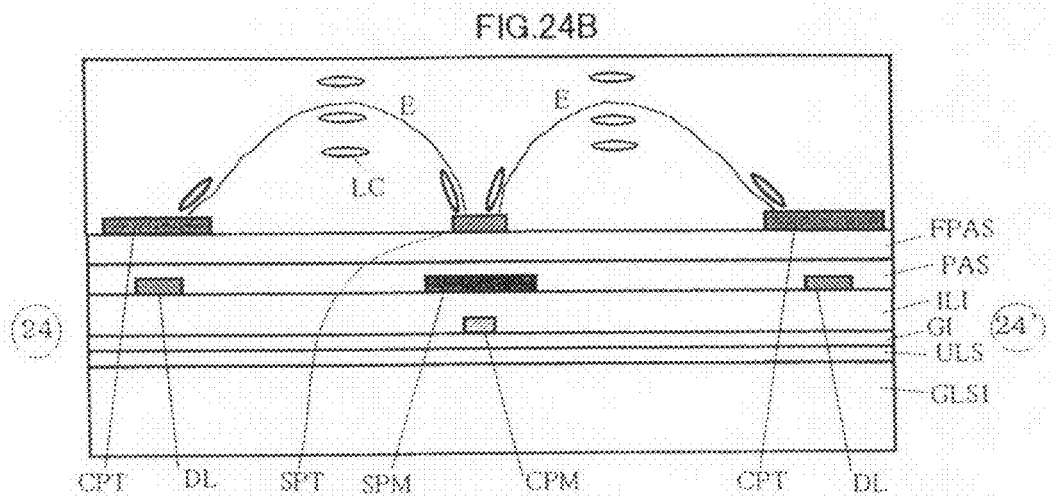
Figure 25:
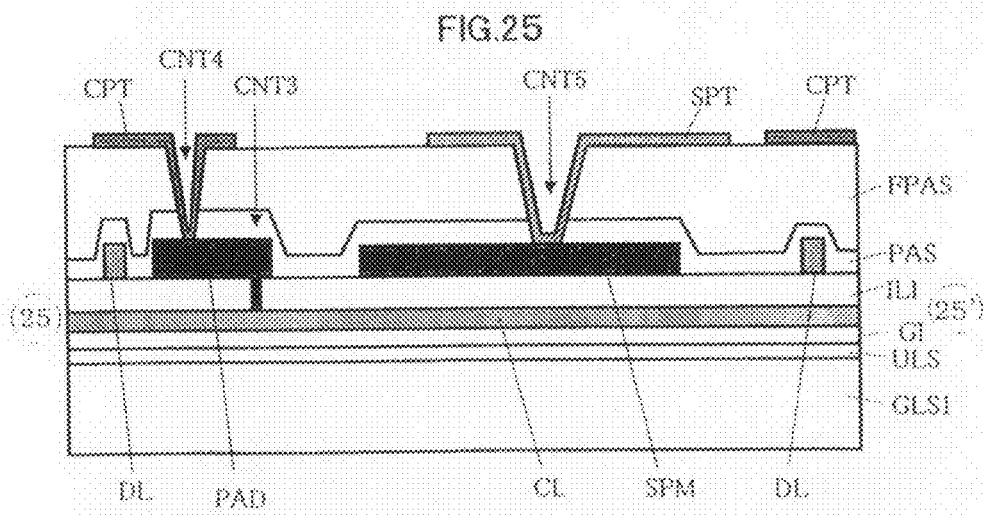
FIG. 25 is a cross-sectional view of an essential part taken along a line 25-25' of a TFT liquid crystal display device according to still another embodiment of the invention.

FIG. 23 is a plan view of one pixel in the fourth embodiment of the present invention, FIG. 24 is a view showing the distribution of transmissivity and a cross-sectional structure along a line 24-24' in FIG. 23, and FIG. 25 is a view showing a cross-sectional structure taken along a line 25-25' in FIG. 23.

The pixel shown in FIG. 23 has two-split transmission regions in the IPS display method with respect to drain lines DL. This structure is suitable for a pixel whose distance between the neighboring drain lines DL is small and can more easily realize a liquid crystal display device of high definition compared to the embodiment 1. In FIG. 23, the sizes of the respective types of lines and electrodes are equal to those of the embodiment 1. However, in FIG. 23, a pitch between pixels is narrow compared to the embodiment 1.

Although the basic structure of this embodiment is substantially equal to that of the embodiment 1, the pitch of pixels is narrow and hence, the pixel is divided into halves. That is, driving of liquid crystal is performed by a lateral electric field which is formed between transparent common electrodes CPT on the drain lines DL and a center transparent pixel electrode SPT. Further, a holding capacitance Cstg is formed by an interlayer insulation film arranged between a metal common electrode CPM and a metal pixel electrode SPM below the center transparent pixel electrode SPT.

The liquid crystal display device using pixels of high definition as in the case of this embodiment is used for a notebook type personal computer which requires the low power consumption as an example. To obtain the high definition, clear images of photographic quality is demanded and hence, the wide viewing angle characteristics is requested.

FIG. 24A and FIG. 24B show the distribution of transmissivity and the structure of a portion taken along a line 24-24' in FIG. 23 respectively. The structure shown in FIG. 24B is explained first. A protective film PAS and an organic protective film FPAS are formed over the drain lines DL and the transparent common electrode CPT is formed over the organic protective film FPAS. Below the center transparent pixel electrode SPT, the metal pixel electrode SPM is formed. Further, below the metal pixel electrode SPM, the metal common electrode CPM is arranged by way of an interlayer insulation film ILI. The holding capacitance Cstg is formed between the metal common electrode CPM and the metal pixel electrode SPM.

The feature of this embodiment lies in that the transparent pixel electrode SPT arranged on the organic protective film FPAS has at least one of end portions thereof shielded from light by the metal pixel electrode SPM arranged below the transparent pixel electrode SPT. In this embodiment, both end portions of the transparent pixel electrode SPT are shielded from light. In view of the display principle of IPS, it is preferable that a potential equal to a potential applied to the transparent electrode which constitutes the upper layer is applied to this electrode which is served for light shielding. Due to such a provision, the disturbance of the display electric field can be prevented. This structure has following features in terms of display. The liquid crystal is driven by only the lateral electric field applied between the transparent pixel electrode SPT and the transparent common electrodes CPT on the organic protective film FPAS exclusively. Accordingly, the transparent pixel electrode SPT and the transparent common electrode CPT are arranged without sandwiching an insulation film between the pixel electrode and the common electrode and hence, the driving voltage can be lowered whereby the circuit power consumption can be reduced.

On the other hand, since a width W1 of the metal pixel electrode SPM arranged below the transparent pixel electrode SPT is set wider than a width W2 of the transparent pixel electrode SPT, the transmitting light of the SPT portion is shielded. In the neighborhood of the ends of the transparent pixel electrode SPT, as shown in FIG. 24B, fringe electric fields in the longitudinal direction are generated so that the liquid crystal molecules LC are erected due to the electric field in the longitudinal direction when the liquid crystal molecules are of positive type. The wide viewing angle of the lateral electric field method is achieved due to the horizontal rotation of the liquid crystal molecules and light which passes through the portion where liquid crystal molecules are erected has characteristics of a narrow viewing angle range. Accordingly, when the relationship between the width W1 of the metal pixel electrode SPM and the width W2 of the transparent pixel electrode SPT is set to W1<W2, the viewing angle characteristics of the liquid crystal display device is deteriorated as a whole. Accordingly, in the present invention, by setting such a relationship to W1>W2, the transmitting light of the SPT portion is shielded thus preventing the deterioration of the viewing angle characteristics. In other words, as shown in FIG. 24A, by shielding the neighborhood of end portions of the transparent pixel electrode SPT which is narrowest in the pixel using the metal having the same potential as the transparent pixel electrode SPT from light, the liquid crystal display device is set free from the deterioration of the viewing angle and can realize the low voltage driving.

Here, as can be understood from FIG. 24B, the end portions of the transparent common electrodes CPT are not shielded from light by the drain lines DL. That is, the end portions of the transparent common electrodes CPT are set as regions which allow the transmission of light. This constitution enhances the numerical aperture and constitutes an important point in the realization of the bright IPS type liquid crystal display device. The electric field which drives the liquid crystal is formed between the transparent common electrode CPT and the transparent pixel electrode SPT. Here, the electric field formed on the electrode having a wide width becomes an electric field which is similar to the lateral electric field also on the electrode, while the electric field formed on the electrode having the narrow electrode width is formed into an electric field similar to the vertical electric field. Accordingly, by performing light-shielding of only the electrode having the narrow electrode width, that is, only the end portions of the transparent pixel electrode SPT, the influence of light to the viewing angle can be substantially prevented. Further, by intentionally obviating light shielding of the end portions of the transparent common electrodes CPT, the high numerical aperture and the high brightness can be realized. That is, it is possible to obtain both of these advantageous effects simultaneously.

FIG. 25 is a cross-sectional view which transverses the neighboring drain lines DL and shows the structure above a common electrode line CL. First of all, the transparent common electrode CPT is made conductive with the common electrode line CL at an electrode Pad PAD through a third contact hole CNT3 formed in an interlayer insulation film ILI. Further, the common electrode potential is supplied to the liquid crystal through a fourth contact hole CNT4 formed in a protective film PAS and an organic protective film FPAS. On the other hand, the transparent pixel electrode SPT supplies the pixel potential to the liquid crystal from the metal pixel electrode SPM through a fifth contact hole CNT5 formed in a protective film PAS and the organic protective film FPAS.

Embodiment 5

Figure 27:
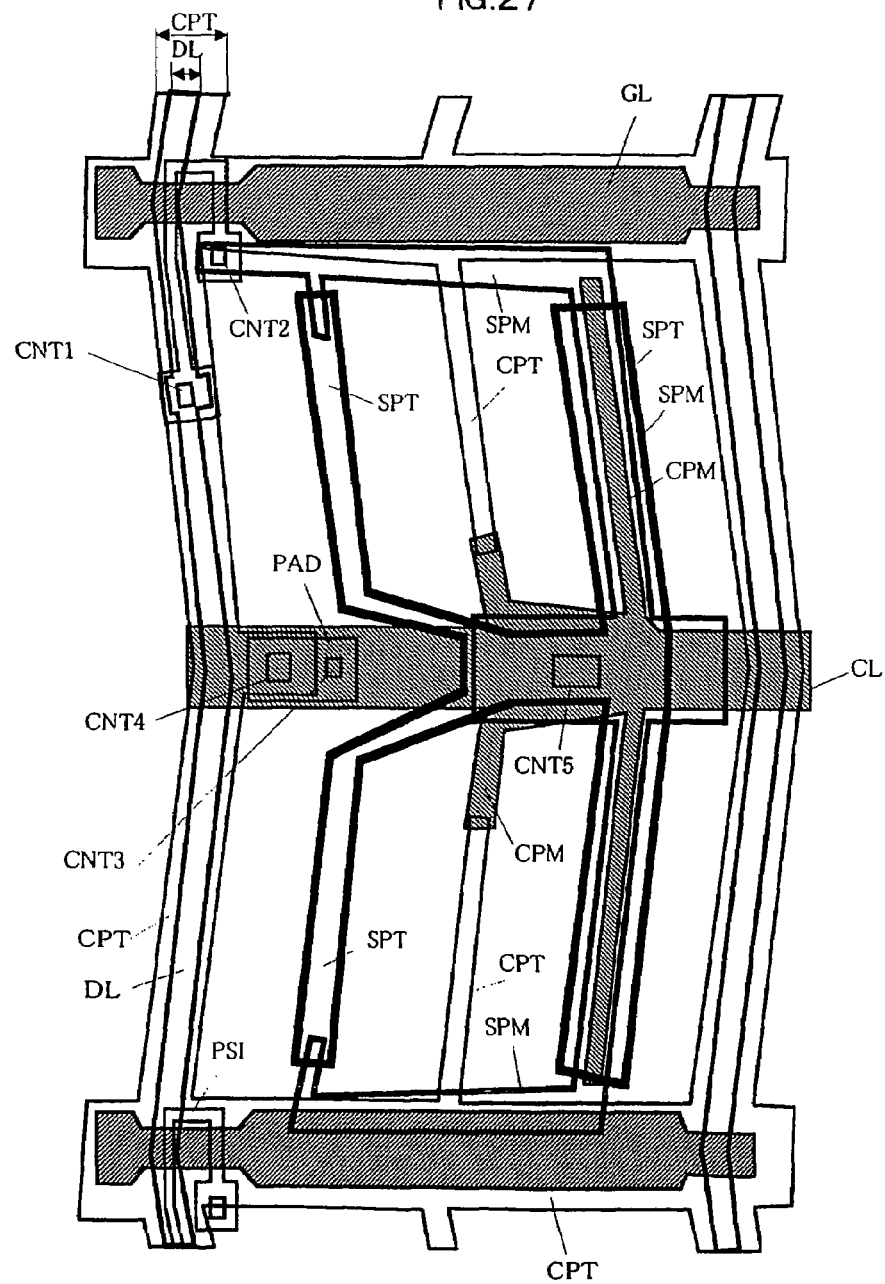
FIG. 27 is a plan view of a pixel of a TFT liquid crystal display device according to another embodiment of the invention.

FIG. 27 shows a planer structure of a pixel. This embodiment differs from the embodiment 1 shown in FIG. 1 in that a gap is formed between a metal pixel electrode SPM and a gate line GL of own stage, that is, the gate line GL at a side on which a switching element served for supplying electricity to the metal pixel electrode SPM is formed, and a transparent pixel electrode SPT is formed such that the transparent pixel electrode SPT covers the gap.

Due to such a constitution, the load of the gate line GL is reduced so that it is possible to obviate the generation of brightness irregularities also with respect to a liquid crystal display device of large sized screen and high definition.

Further, by forming a superposed position between the gate line GL of own stage and the gate line GL of other stage, the pixel can obtain a function of an additional capacitance Cadd and the waveform strain can be corrected so that image qualities are enhanced.

Further, the transparent common electrode CPT which is formed of a transparent electrode is provided in a gap defined between the metal common electrode CPM and the gate line GL. Accordingly, they have the same potential with respect to the liquid crystal layer and hence, by adopting the normally black mode, the light shielding due to . . . can be realized.

Accordingly, this embodiment realizes an extremely skillful constitution which causes no drawbacks also with respect to light shielding.

Embodiment 6

Figure 28:
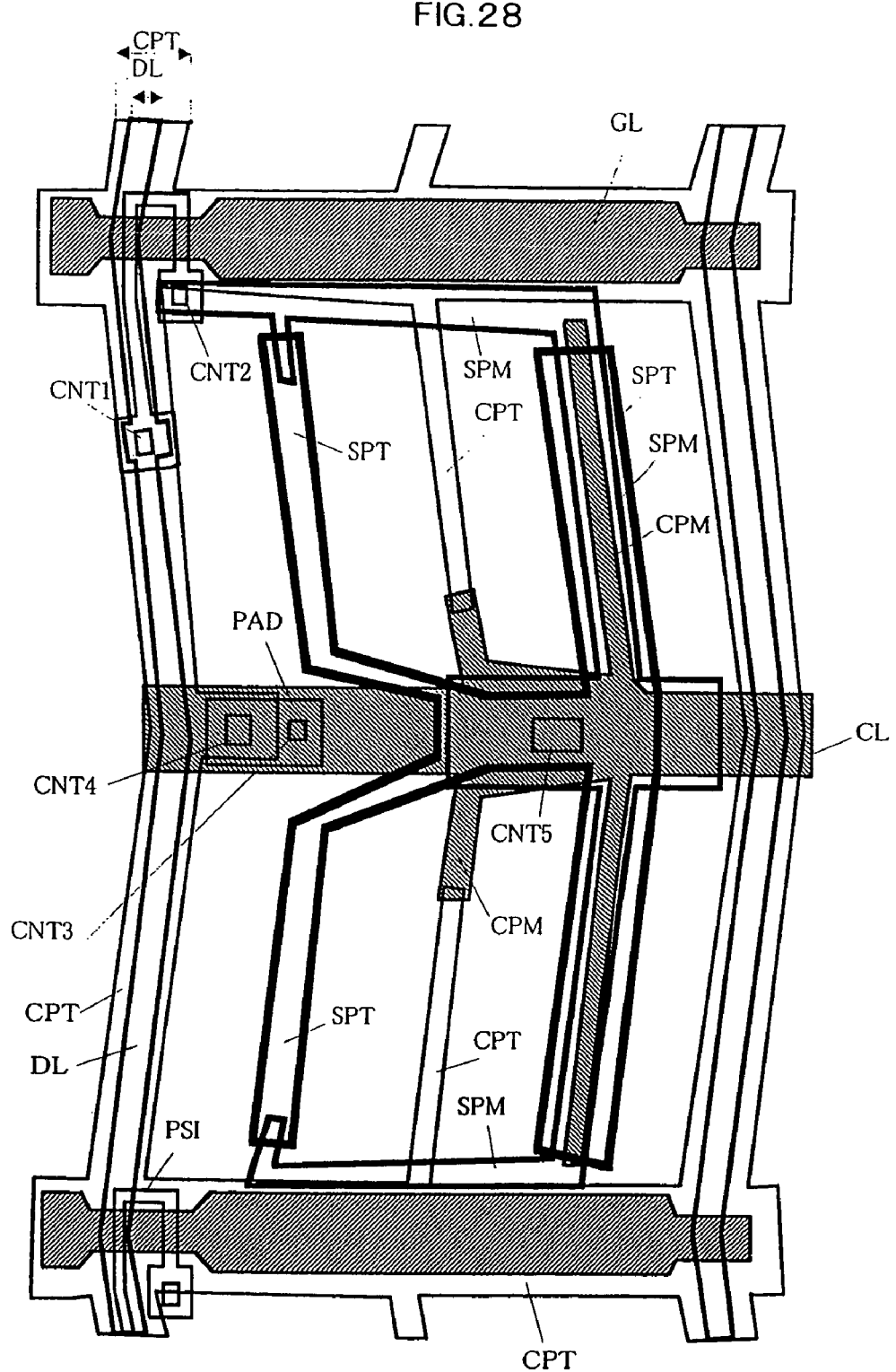
FIG. 28 is a plan view of a pixel of a TFT liquid crystal display device according to another embodiment of the invention.

FIG. 28 shows a planer structure of a pixel. The difference between this embodiment and the embodiment shown in FIG. 27 lies in that a gap is also formed between the metal pixel electrode SPM and the gate line GL of other stage.

Due to such a constitution, a pure Cstg structure can be realized so that the load of the gate line GL can be minimized whereby it is possible to easily realize the liquid crystal display device of a large screen and high definition.

Embodiment 7

Figure 29:
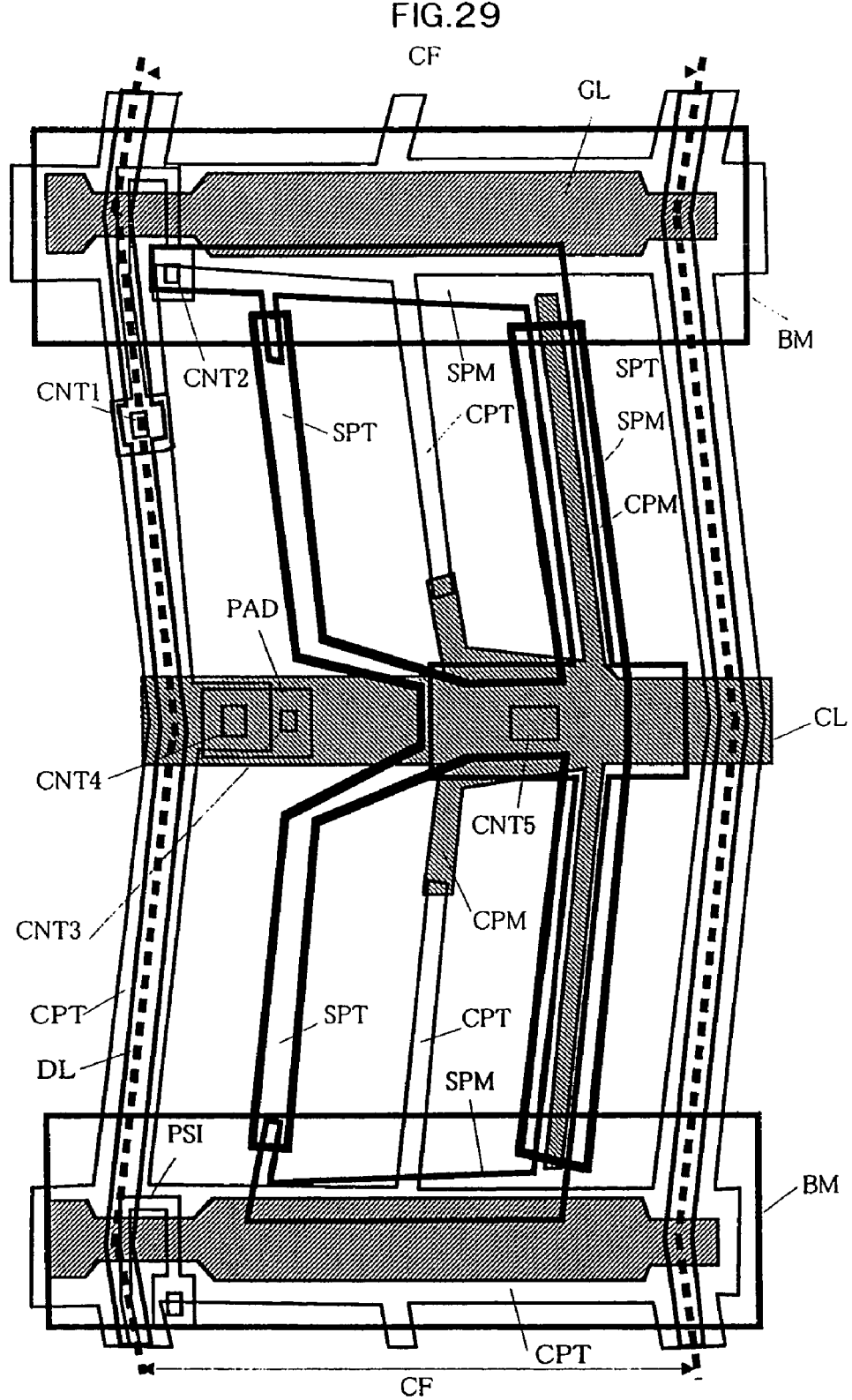
FIG. 29 is a plan view for explaining the arrangement of a black matrix and a color filter layer of the pixel of the TFT liquid crystal display device according to another embodiment of the invention.

FIG. 29 shows a planer structure of pixel of this embodiment. The difference between this embodiment and the embodiment shown in FIG. 1 lies in the constitutions of a black matrix BM and color filters CF.

In this embodiment, boundaries of the color filters CF are arranged on the drain lines DL. The black matrix BM is formed of a stripe-like black matrix which is formed overly in the lateral direction.

A light irradiation quantity from a back light BL is determined as the brightness of the backlight BL at the time of designing products and hence, the light irradiation quantity is a controllable value. Accordingly, by designing such that leaking of light falls within an allowable range with respect to the value, it is possible to ensure the holding characteristics.

On the other hand, with respect to an external light from a viewer side or an image display side, the light quantity extremely differs depending on an environment. The light quantity becomes 0 when the liquid crystal display device is used in a dark place and the liquid crystal display device may be used under an ultra high light quantity such as under a spot light. Further, the external light is not always uniformly irradiated within a panel surface. Accordingly, the intensity of external light may extremely differ between the right side and the left side in plane, for example. It has been found that, in such a case, there arises the difference in a leak quantity in plane and the difference of brightness is generated in plane.

Although the fact that the light quantity differs depending on the environment per se constitutes a problem, a reflection light quantity on a surface of the liquid crystal display device is increased at a place where the external light is strong and hence, the image quality and contrast are relatively reduced and hence, the deterioration of image quality per se due to the external light is not so apparent. To the contrary, it has been found that when the difference of intensity of the external light is generated in plane, this leads to the difference of brightness in plane due to the difference of a leaking quantity so that such brightness difference becomes extremely apparent since the brightness difference is compared in the same viewing field.

Then, the inventors of the present invention have found that it is desirable to form a light shielding layer with respect to light entering from the observation side also with respect to the polysilicon TFT.

In FIG. 29, a light shielding layer BM is formed in a lateral stripe shape so as to realize a stable display without being influenced by an environment due to the formation of the light shielding layer BM and to suppress the reduction of the numerical aperture. Due to such a constitution, a liquid crystal display device of high performance served for multiple uses which is not influenced by the environment can be realized.

Embodiment 8

Figure 30:
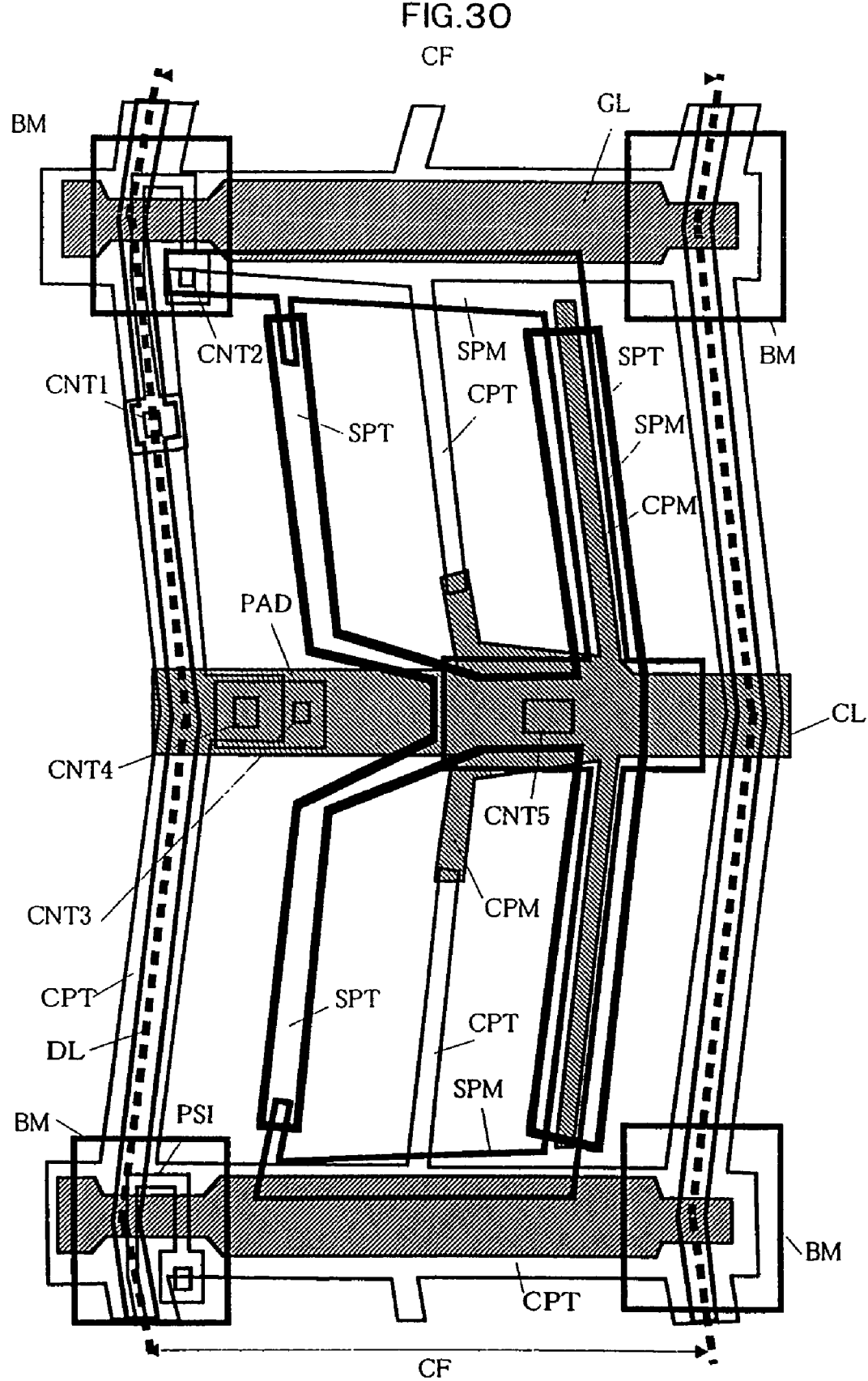
FIG. 30 is a plan view for explaining the arrangement of a black matrix and a color filter layer of the pixel of the TFT liquid crystal display device according to another embodiment of the invention.

FIG. 30 shows a modification of the structure shown in FIG. 29, wherein they differ in a shape of the light shielding layer. In FIG. 30, the light shielding layer is formed like an island.

As a result, a P—Si island PSI has a portion thereof subjected to light shielding by a drain line and another portion subjected to light shielding by a gate line GL, and remaining PSI portions which are not subjected to light shielding by the drain line DL and the gate line GL are subjected to light shielding by an island-like light shielding layer BM whereby a liquid crystal display device which is not influenced by the external environment can be realized.

Embodiment 9

Figure 31:
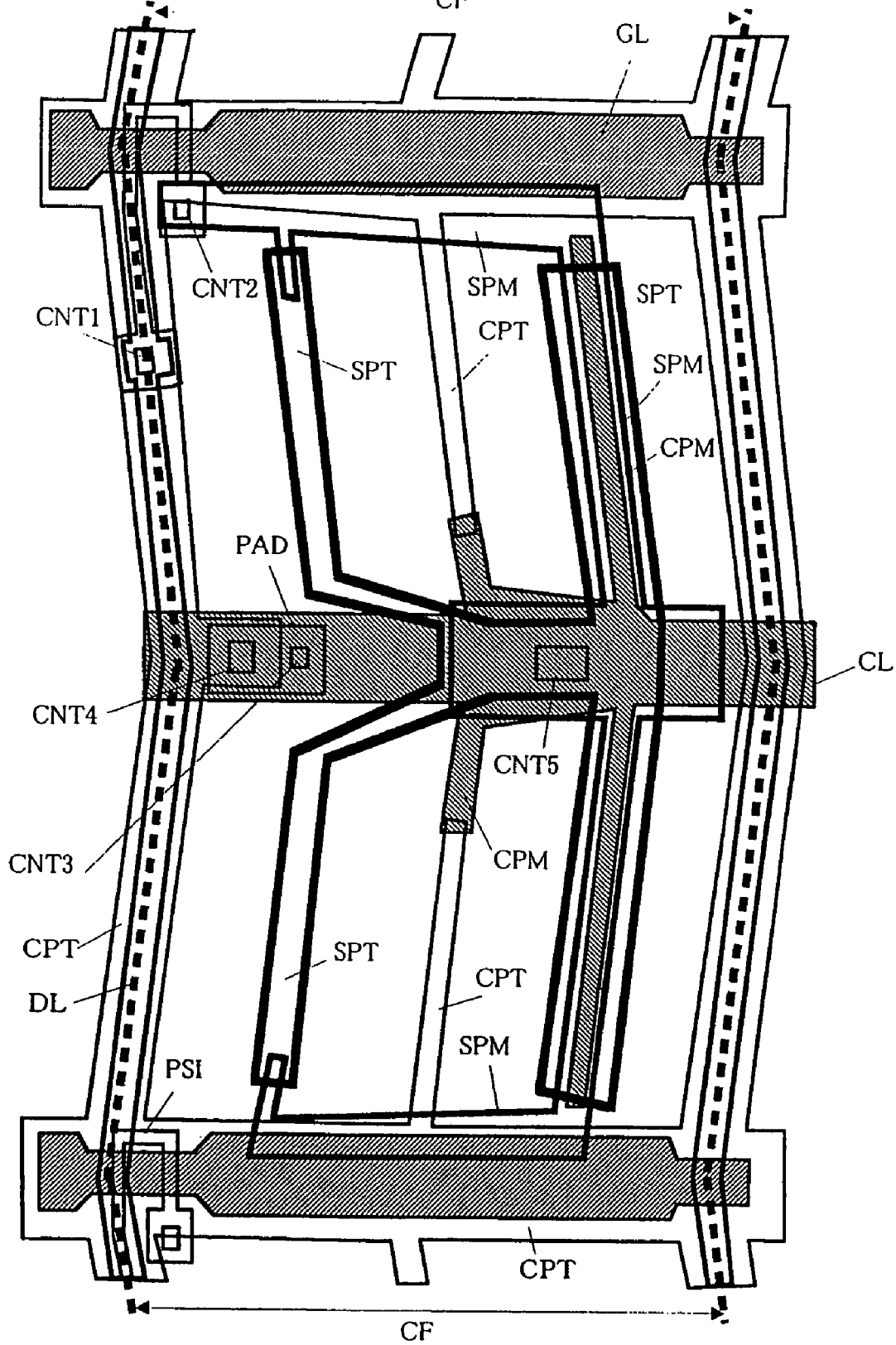
FIG. 31 is a plan view for explaining the arrangement of a black matrix and a color filter layer of the pixel of the TFT liquid crystal display device according to another embodiment of the invention.

FIG. 31 shows an example in which light shielding layer is not formed.

With respect to an LCD panel which is mounted on a liquid crystal monitor or an liquid crystal TV set, they are mainly served for indoor use. Accordingly, except for particular business use, the in-plane light irradiation intensity is relatively uniform so that the intensity falls in a relatively limited range in view of the fact that the standard of illuminance on illumination is standardized by JIS or other standard. In such an application, it is possible to realize the performance which does not cause any serious problems in actual use even when the light shielding layer is not provided. Further, it is possible to reduce the manufacturing cost so that the reduction of cost which is extremely important in the market can be realized.

Embodiment 10

Figure 33:
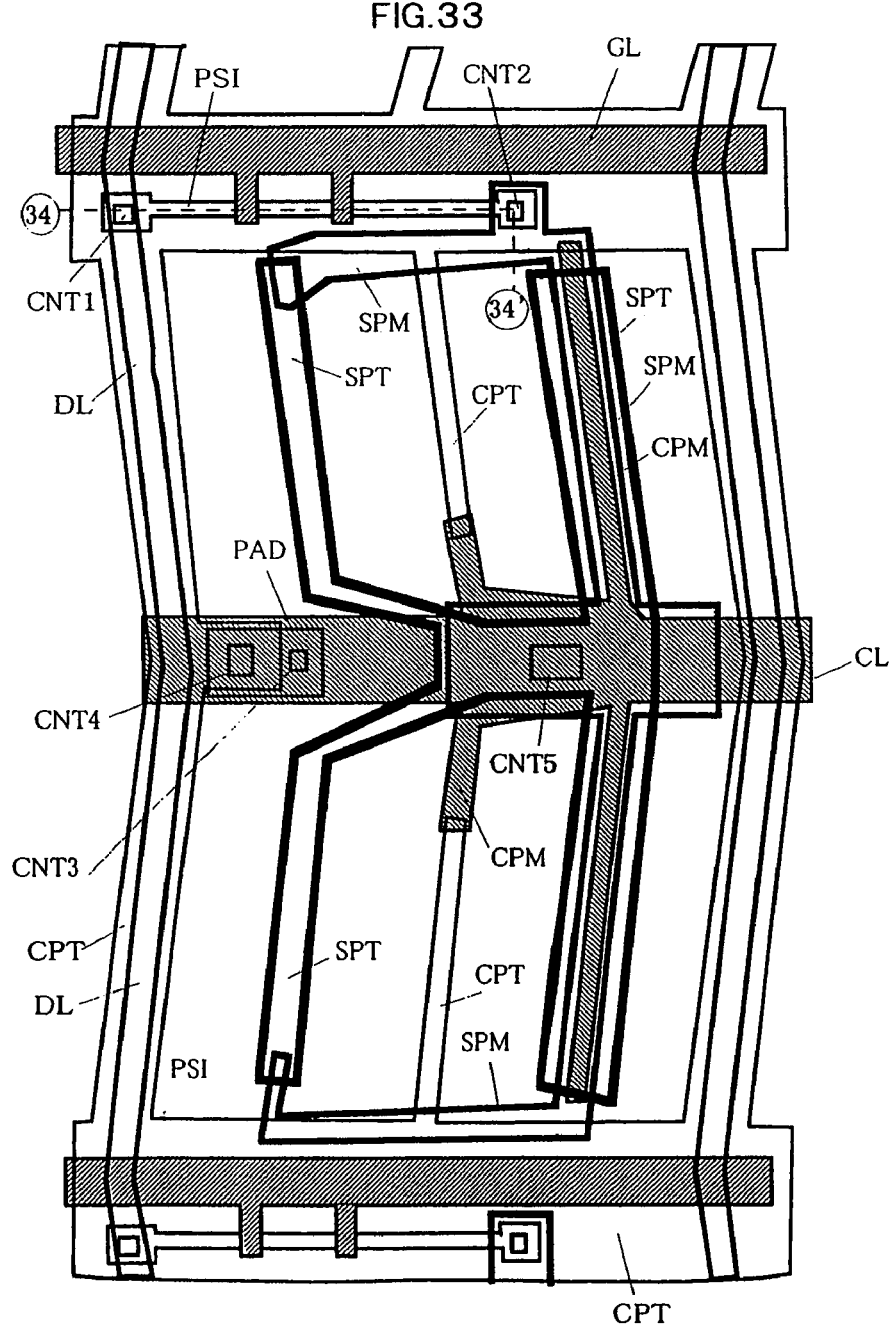
FIG. 33 is a plan view of a pixel of a TFT liquid crystal display device according to another embodiment of the invention.
Figure 34:
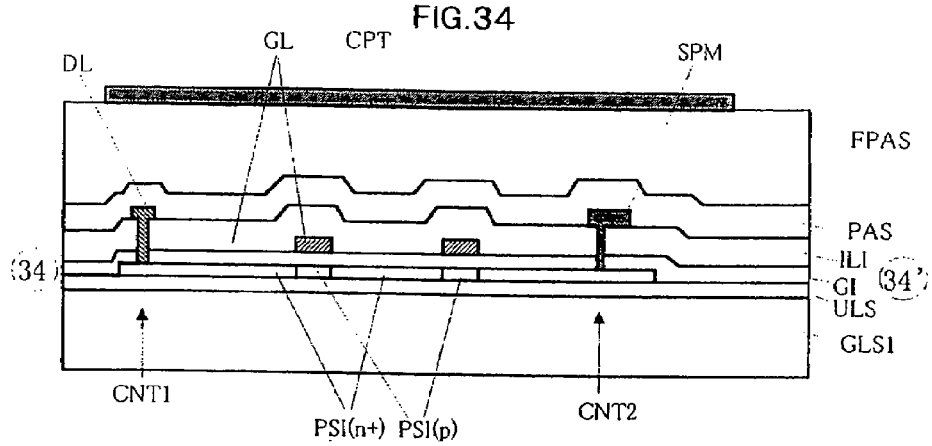
FIG. 34 is a cross-sectional view of an essential part taken along a line 34-34' of the TFT liquid crystal display device according to another embodiment of the invention.

The largest difference between this embodiment shown in FIG. 33 and the embodiment shown in FIG. 1 lies in the TFT pattern. A cross-sectional view taken along a line 34-34' in FIG. 33 is shown in FIG. 34. A P—Si island PSI layer is connected to a drain line DL through a contact hole CNT1 and extends substantially parallel to a gate line GL and is connected to a metal pixel electrode SPM through a contact hole CNT2.

Due to such a constitution, it is possible to eliminate a bent portion from the P—Si island PSI layer and hence, the flow of electrons during a writing time of the TFT which is an extremely short time compared to the holding time can be enhanced whereby the writing characteristics are enhanced. Accordingly, the number of external drivers can be reduced thus enabling the reduction of cost and the definition of the liquid crystal display device can be enhanced.

Further, according to the structure of this embodiment, it is possible to make the positions of the contact hole CNT1 and CNT2 more spaced apart from each other compared to the case shown in FIG. 1. With respect to the through hole portions, when the through holes formed in the same layer are arranged close to each other, such a structure is liable to cause various draw backs. For example, both through holes are integrated at the time of etching and are short-circuited or the density of etching sputtering material at the time of etching is locally increased thus generating insufficient etching so that the through holes are not formed. According to the structure of this embodiment, by making the through holes formed in the same layer sufficiently spaced apart from each other, the through holes formed in the same layer can be formed in a more stable manner and with higher accuracy.

Further, an intersecting portion between the P—Si island PSI and the drain line DL and an intersecting portion of the P—Si island PSI and the gate line GL can be minimized and hence, it is possible to realize the further enhancement of the prevention of brightness irregularities in the longitudinal direction due to the reduction of load of the drain line DL. Further, since the P—Si island PSI extends parallel to the gate line GL, the P—Si island PSI can be also used as a bypass line for correction when the gate line GL is disconnected.

In this embodiment, a transparent common electrode CPT is formed over the P—Si island PSI which extends substantially parallel to the gate line GL. Due to such a constitution, it is possible to prevent a phenomenon that the characteristics of the P—Si island PSI is fluctuated due to static electricity caused by rubbing or the like during the manufacturing steps. Further, with respect to this defensive structure against static electricity, the structure shown in the embodiment 1 or other embodiment can also obtain the advantageous effect provided that the transparent common electrode is superposed on the P—Si island PSI.

Figure 35:
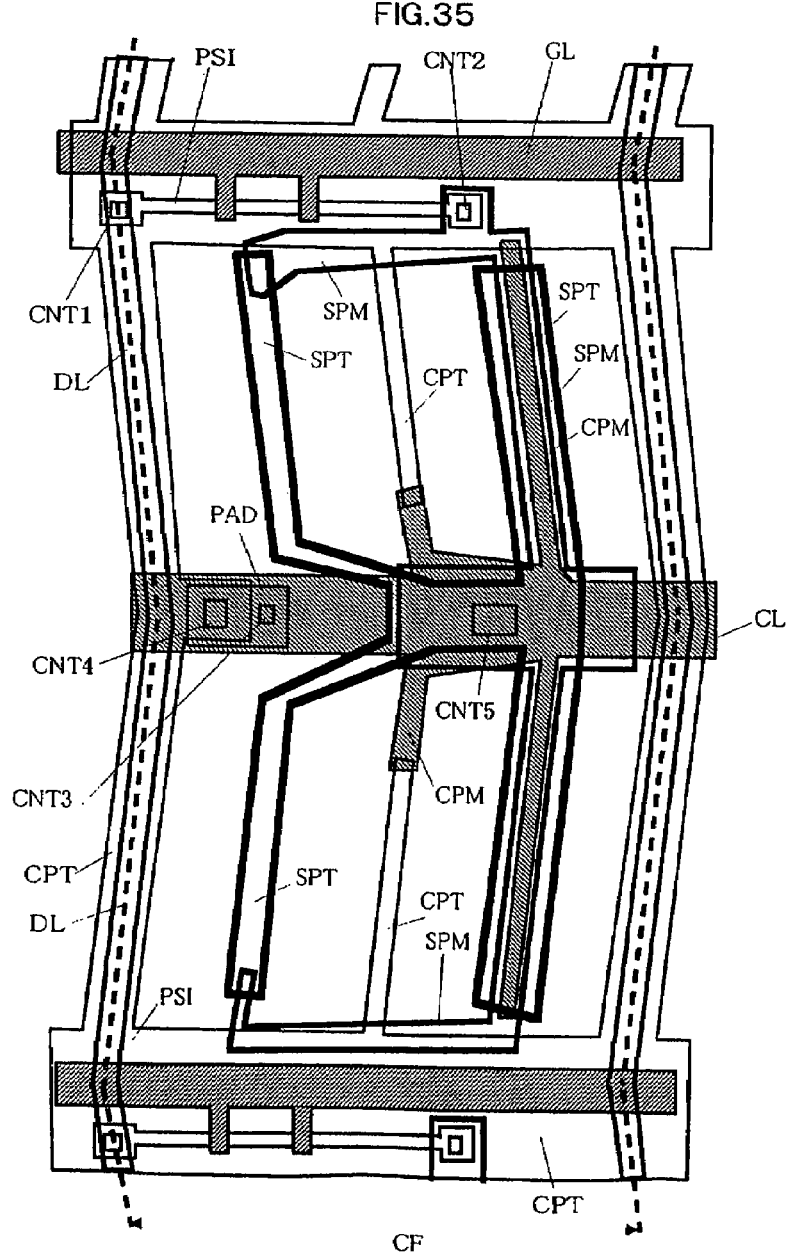
FIG. 35 is a plan view for explaining the arrangement of a black matrix and a color filter layer of the pixel of the TFT liquid crystal display device according to another embodiment of the invention.

FIG. 35 is an explanatory view in which boundaries of color filters CF are arranged on drain lines DL.

Figure 36:
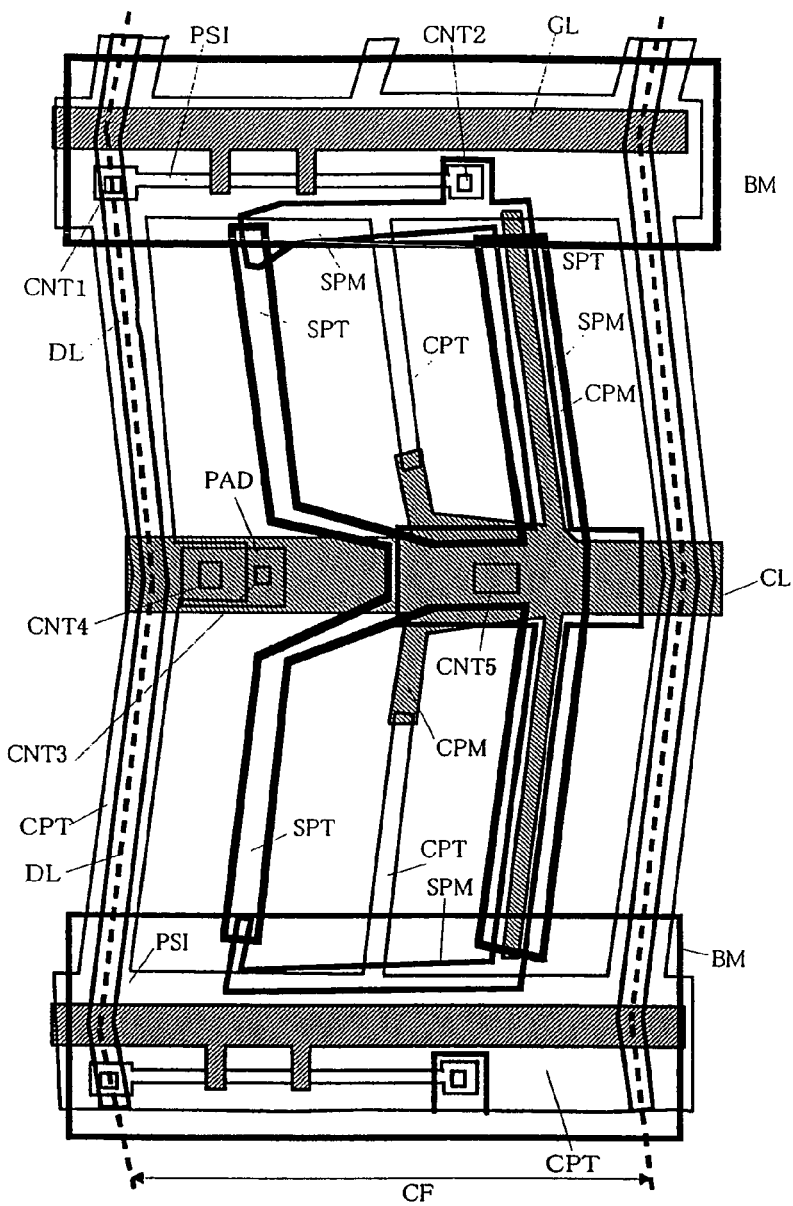
FIG. 36 is a plan view for explaining the arrangement of a black matrix and a color filter layer of the pixel of the TFT liquid crystal display device according to another embodiment of the invention.

FIG. 36 shows an example in which a light shielding layer BM having a lateral stripe shape is formed. This constitution also can obtain the similar advantageous effect as that of the embodiment 7.

Embodiment 11

Figure 37:
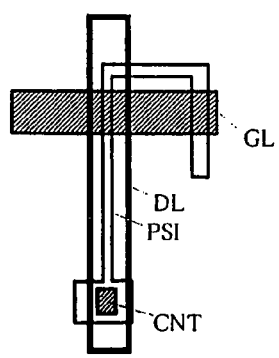
FIG. 37 is a view showing the connection between a semiconductor layer and a DL according to another embodiment of the invention.
Figure 38:
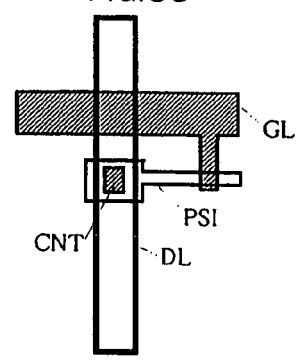
FIG. 38 is a view showing the connection between a semiconductor layer and a DL according to another embodiment of the invention.

FIG. 37 and FIG. 38 show a contact portion between a drain line DL and a P—Si island PSI. A contact between the drain line DL and the P—Si island PSI is achieved by a contact hole CNT. Accordingly, the working accuracy of the contact hole CNT influences an electricity supply area. Further, when the misalignment between the drain line DL and the P—Si island PSI layer is large, they are displaced from each other to an extent that they can not be brought into contact with each other at the contact hole CNT. Accordingly, to realize the stable contact between the drain line DL and the P—Si island PSI, it is desirable that the drain line DL layer and the P—Si island PSI layer are not easily displaced from the contact hole CNT even when the misalignment between the drain line DL layer and the P—Si island PSI layer is generated.

It has been found that when a side surface of the contact hole CNT and the drain line DL intersect each other obliquely as in the case shown in FIG. 1, corner portions of the contact hole CNT constitute portions which are liable to be easily displaced from the drain line DL. Accordingly, in this embodiment, one side surface of the contact hole CNT is arranged substantially parallel to the drain line DL. Due to such a constitution, even when there exists the misalignment it is possible to provide the contact which hardly generates contact failure.

Further, along with such a constitution, by constituting the gate line GL and the drain line DL substantially at a right angle, and by constituting the contact hole using an extension portion of the drain line DL which intersects at a right angle, both loads of gate line GL and drain line DL can be reduced.

Embodiment 12

Figure 39:
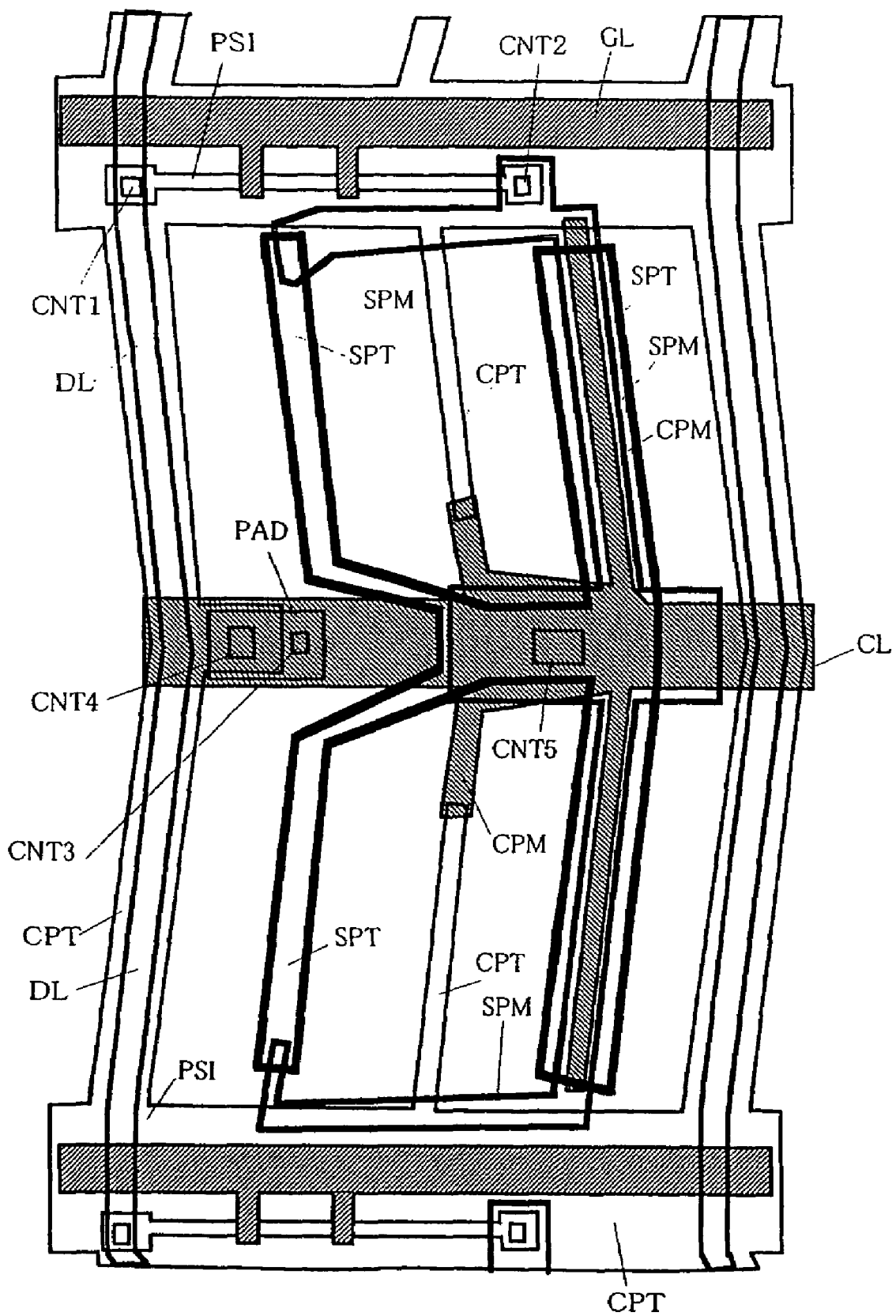
FIG. 39 is a plan view of a pixel of a TFT liquid crystal display device according to another embodiment of the invention.

FIG. 39 is a view showing a pixel formed by applying the TFT structure shown in FIG. 38 to the pixel shown in FIG. 33. The drain line DL makes a third inclination angle which is different from both of two inclination angles in the inside of the pixel in the neighborhood of the gate line GL. That is, the drain line DL is arranged substantially at a right angle with respect to the gate line GL and a contact hole CNT1 for a P—Si island PSI is formed in the third inclination portion.

Figure 40:
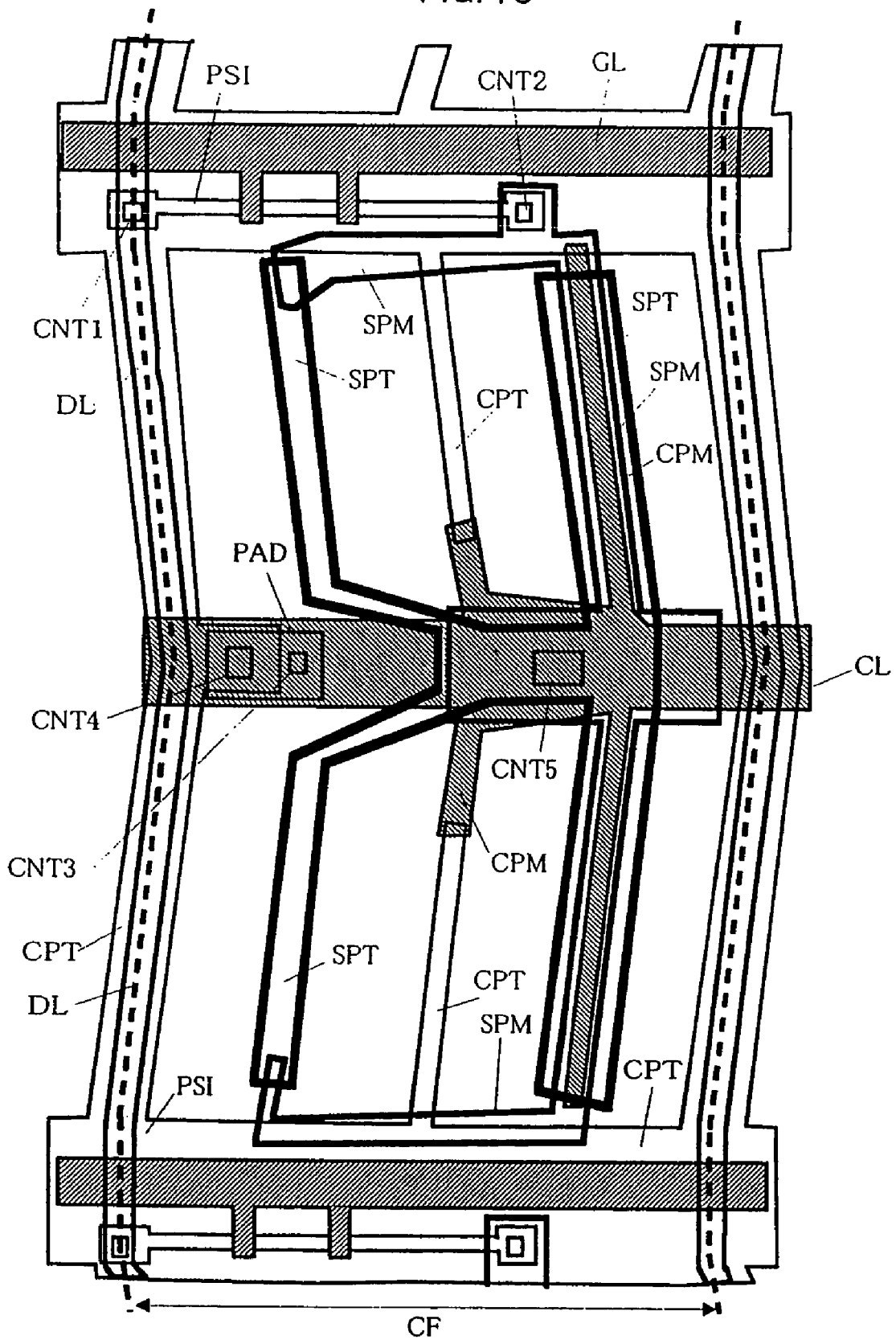
FIG. 40 is a plan view for explaining the arrangement of the pixel and a color filter layer CF of the TFT liquid crystal display device according to another embodiment of the invention.

FIG. 40 is an explanatory view for explaining the arrangement of a color filter CF shown in FIG. 39. A boundary is formed over the drain line DL and substantially parallel to the drain line DL. Due to such a constitution, in a region where the drain line DL intersects the gate line GL, the drain line DL and the gate line GL intersect at a right angle and hence, the CF boundary is also formed such that the CF boundary intersects the gate line GL at a right angle.

This embodiment can obtain the advantageous effect of the embodiment 11 in a particular manner.

Embodiment 13

Figure 41:
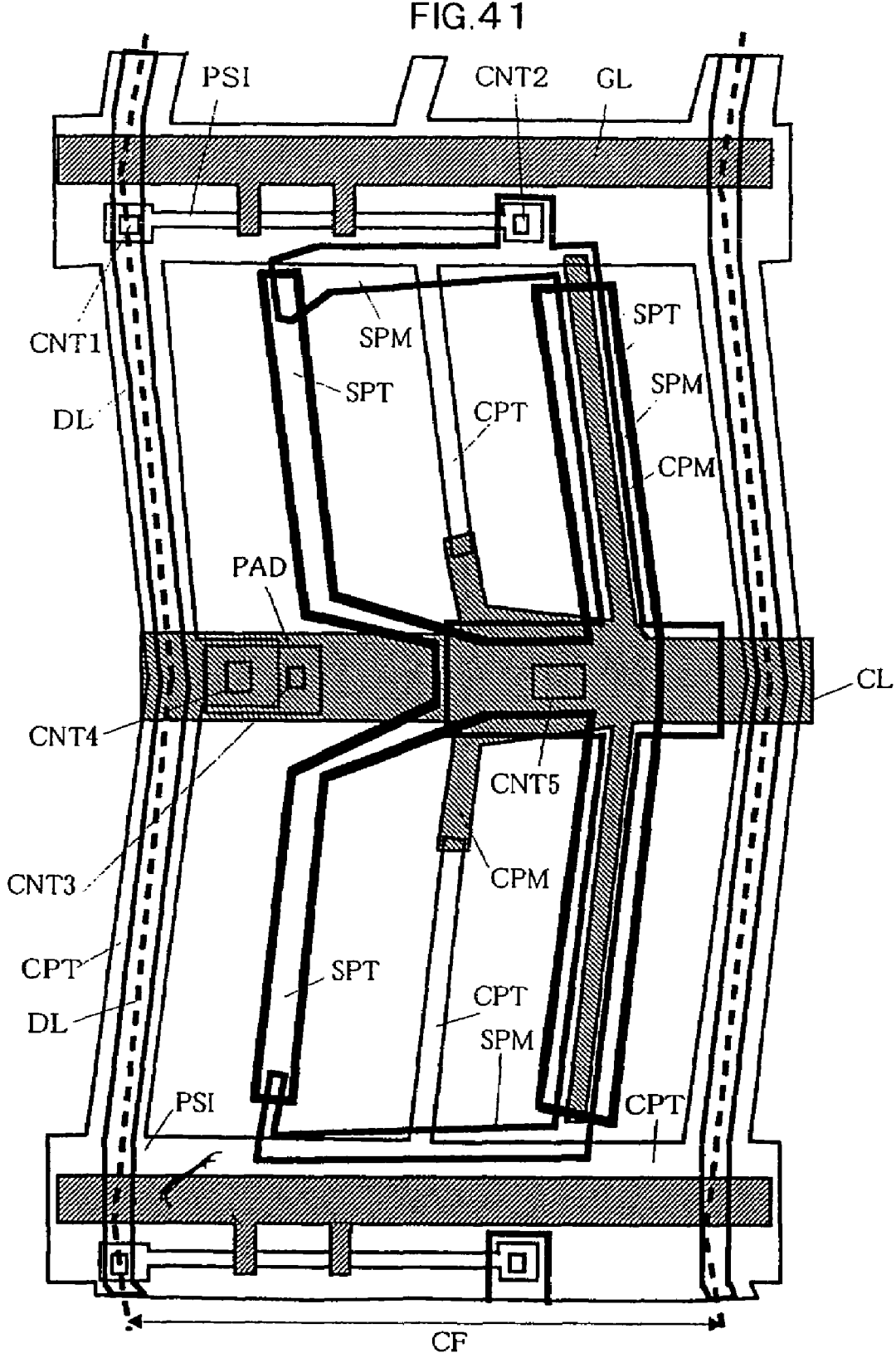
FIG. 41 is a plan view for explaining the arrangement of the pixel and a color filter layer of the TFT liquid crystal display device according to another embodiment of the invention.

FIG. 41 is a view which corresponds to FIG. 40.

The constitution of this embodiment shown in FIG. 41 differs from the constitution of the embodiment shown in FIG. 40 in a pattern of boundary portions of a color filter CF at the intersecting portions with the gate line GL. In this embodiment, although the drain lines DL and the gate lines GL intersect each other perpendicularly, the color filters CF and the gate lines GL intersect each other non-perpendicularly. That is, the color filter CF is formed along respective imaginary extension lines of the first angle and the second angle of the drain lines DL in the pixel.

Since the color filter CF has no electric connection with the drain line DL, the gate line GL and the P—Si island PSI, it is unnecessary for the boundaries of the color filter CF to intersect the gate line GL at a right angle. Accordingly, the boundary portions of the color filter CF are made to intersect the gate line GL on the extension line of the angle of the drain line DL in the display region so that the number of bending of the color filter CF can be reduced.

The color filter CF is formed of an organic resin film and is patterned such that the color filter CF has the boundary with a color filter CF of other color at a position defined between pixels. Accordingly, it is desirable to simplify the shape of the boundary portion as much as possible from a viewpoint of the prevention of color mixing and the enhancement of productivity. The enhancement of productivity is realized by reducing the number of bending of the color filter CF which is brought about by the reduction of the number of bending of the drain line DL.

Although the technical concept of the present invention has been explained in detail using several embodiments heretofore, it is needless to say that the technical concepts of respective embodiments can be applied in combination.

As has been described heretofore in detail, due to the provision of the IPS display type liquid crystal display device which is mainly constituted of the low-temperature polysilicon TFT, it is possible to provide the highly reliable liquid crystal display device of high image quality which is bright and exhibits low power consumption due to low driving voltage, high stability with respect to environment, high productivity, high yield rate, excellent uniformity of brightness and high contrast ratio.

What is claimed is:
1. An active matrix type liquid crystal display device including
   a liquid crystal layer sandwiched between a first transparent first substrate and a second transparent second substrate, wherein a plurality of gate lines and a plurality of drain lines which intersect the plurality of gate lines in a matrix array are formed over the first transparent substrate, a pixel region is defined by a region surrounded by two gate lines among the plurality of gate lines and two drain lines among the plurality of drain lines, and the pixel region includes a TFT element, a transparent conductive layer, and a the conductive layer, the transparent conductive layer is formed closer to the liquid crystal layer side rather than to a layer in which the drain line is formed, and the transparent conductive layer has a first bending portion, and the metal conductive layer is formed in the same layer as the drain line and overlaps with the transparent conductive layer, and the metal conductive layer has a second bending portion.

2. An active matrix type liquid crystal display device according to claim 1, wherein the first bending portion of the transparent conductive layer and the second bending portion of the metal conductive layer have the same bending angle.

3. An active matrix type liquid crystal display device according to claim 1, wherein the transparent conductive layer has a plurality of first bending portion portions in one pixel region.

4. An active matrix type liquid crystal display device according to claim 1, wherein the first bending portion of the transparent conductive layer and the second bending portion of the metal conductive layer are the shape of "<" substantially V-shaped, respectively.

5. An active matrix type liquid crystal display device according to claim 1, wherein the transparent conductive layer does not overlap the gate line and the drain line.

6. An active matrix type liquid crystal display device according to claim 1, wherein the metal conductive layer does not overlap to at least the drain line.

7. An active matrix type liquid crystal display device according to claim 1, wherein the transparent conductive layer is connected to the metal conductive layer through a contact hole.

8. An active matrix type liquid crystal display device according to claim 7, wherein the contact hole is formed on a metal line which crosses the pixel region.

9. An active matrix type liquid crystal display device according to claim 8, wherein the metal line is formed in the same layer as the gate line.

10. An active matrix type liquid crystal display device according to claim 1, wherein the transparent conductive layer functions as a pixel electrode.

* * * * *